(12) United States Patent
Matsuzawa et al.

(10) Patent No.: US 10,536,603 B2
(45) Date of Patent: Jan. 14, 2020

(54) LIGHT GUIDE AND IMAGE READING APPARATUS

(71) Applicant: Mitsubishi Electric Corporation, Chiyoda-ku (JP)

(72) Inventors: Taku Matsuzawa, Chiyoda-ku (JP); Toru Shiraki, Chiyoda-ku (JP); Hideki Kunishio, Chiyoda-ku (JP); Daisuke Ohama, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/319,527

(22) PCT Filed: Jan. 17, 2018

(86) PCT No.: PCT/JP2018/001236
§ 371 (c)(1),
(2) Date: Jan. 22, 2019

(87) PCT Pub. No.: WO2019/003480
PCT Pub. Date: Jan. 3, 2019

(65) Prior Publication Data
US 2019/0379801 A1 Dec. 12, 2019

(30) Foreign Application Priority Data
Jun. 28, 2017 (JP) .................. 2017-125771

(51) Int. Cl.
*H04N 1/04* (2006.01)
*H04N 1/028* (2006.01)
*F21V 8/00* (2006.01)

(52) U.S. Cl.
CPC ........... *H04N 1/0289* (2013.01); *G02B 6/001* (2013.01); *H04N 1/02835* (2013.01); *H04N 1/04* (2013.01)

(58) Field of Classification Search
CPC ............ H04N 1/0289; H04N 1/02815; H04N 1/02835; H04N 1/04; H04N 1/0461;
(Continued)

(56) References Cited

U.S. PATENT DOCUMENTS

2006/0120098 A1 6/2006 Ikeda et al.
2009/0201675 A1 8/2009 Onishi et al.
(Continued)

FOREIGN PATENT DOCUMENTS

JP 2001-330734 A 11/2001
JP 2006-73383 A 3/2006
(Continued)

OTHER PUBLICATIONS

International Search Report dated Apr. 17, 2018 in PCT/JP2018/001236 filed Jan. 17, 2018.

*Primary Examiner* — Gabriel I Garcia
(74) *Attorney, Agent, or Firm* — Oblon, McClelland, Maier & Neustadt, L.L.P.

(57) ABSTRACT

An objective of the present disclosure is to obtain a light guide and an image reading apparatus capable of efficiently irradiating an object to be irradiated (1). The light guide and the image reading apparatus include a rod-shaped light guide main body (2) extending in the longitudinal direction, a first end face (3) that is an end face of the light guide main body (2) along the transverse direction, a light scattering pattern (5) that scatters light that enters from the first end face (3) and is guided inside the light guide main body (2), and a light emission surface portion (6) formed on the light guide main body along a longitudinal direction, the light emission surface portion (6) being a surface from which the light scattered at the light scattering pattern (5) is emitted to outside the light guide main body (2) after being reflected on a wall surface of the light guide main body (2).

The light emission surface portion (6) includes a first light emission surface (6a) that is disposed near the first end face (3) in the longitudinal direction and a second light emission surface (6b) that is contiguous with the first light emission surface (6a) in the longitudinal direction. A width of the first light emission surface (6a) in the transverse direction is shorter than a width of the second light emission surface (6b) in the transverse direction.

20 Claims, 21 Drawing Sheets

(58) Field of Classification Search
CPC .............. H04N 1/1061; H04N 1/40056; H01L 27/4629; G02B 6/001; G02B 6/0096
USPC ........................................................ 358/474
See application file for complete search history.

(56) References Cited

U.S. PATENT DOCUMENTS

| | | | |
|---|---|---|---|
| 2012/0320630 A1* | 12/2012 | Shimizu | G02B 6/0091 362/611 |
| 2014/0355078 A1 | 12/2014 | Fujiuchi et al. | |
| 2015/0062670 A1 | 3/2015 | Yoshida et al. | |
| 2015/0249104 A1 | 9/2015 | Ota et al. | |
| 2016/0134775 A1* | 5/2016 | Iwamatsu | H04N 1/0289 358/509 |
| 2016/0212294 A1 | 7/2016 | Ohzawa | |
| 2016/0277632 A1 | 9/2016 | Ouchi | |

FOREIGN PATENT DOCUMENTS

| | | |
|---|---|---|
| JP | 2006-191521 A | 7/2006 |
| JP | 2007-184186 A | 7/2007 |
| JP | 2008-140726 A | 6/2008 |
| JP | 2009-21158 A | 1/2009 |
| JP | 2009-65244 A | 3/2009 |
| JP | 2010-277940 A | 12/2010 |
| JP | 2015-73264 A | 4/2015 |
| JP | 2015-195152 A | 11/2015 |
| JP | 2016-133646 A | 7/2016 |
| JP | 2016-178374 A | 10/2016 |
| JP | 2017-85670 A | 5/2017 |
| WO | WO 2013/114720 A1 | 8/2013 |
| WO | WO-2019003480 A1 * | 1/2019 |

* cited by examiner

LIGHT GUIDE AND IMAGE READING APPARATUS

TECHNICAL FIELD

The present disclosure relates to a light guide for a lighting device and an image reading apparatus including the light guide.

BACKGROUND ART

A light guide is formed by a rod shaped transparent body and is used for a lighting device (line light source device). A lighting device including the light guide (line light source device) is provided with, for example, a light source such as an LED. Light emitted from the light source enters from an end face (light incident surface) of the light guide, is guided inside the light guide. The lighting device emits linear light from a light emission surface that is a side surface of the light guide. The lighting device (line light source device) including the light guide is advantageously used for lighting applications of image reading apparatuses such as a facsimile, a copying machine, a scanner, and a bill discriminator. Some image reading apparatuses include a lighting device (line light source device) inside a housing thereof.

Some conventional light guides include light guides having a recessed portion whose side is cutout (for example, refer to Patent Literature 1 and Patent Literature 2). In addition, some light guides include a light emission side surface from which light is emitted, the light emission side surface being a lens surface (refer to, for example, Patent Literature 3). Further, some light guides include a rod-shaped light guide whose vicinity of a light incident end face is thin (refer to, for example, Patent Literature 4 and Patent Literature 5).

When such light guides are used for a lighting device (line light source device), there are cases in which rotation of the light guide is prevented by holding an end face of the light guide using a light guide holder, and providing a recess in the light guide (for example, refer to Patent Literature 6). In many cases, light guide holders often have a function of suppressing leakage light that is light leaking from the vicinity of the end face of the light guide.

Leakage light from the vicinity of the end face of the light guide is preferably made uniform due to a large amount of the light being emitted without numerous repeated reflections inside the light guide. A light guide exists that is developed with the objective of making uniform the light emitted near the end face of the light guide by using a light diffusion concavo-convex portion formed on the side surface of the light guide (refer to, for example, Patent Literature 7).

Further, when the light guide is used for a lighting device (line light source device), there is a light guide holder including a peaked portion (refer to, for example, Patent Literature 8, and Patent Literature 9). Further, there are light guides including, besides the light guide holder, a connecting portion or a retaining portion that can block the light of the light guide and that covers a portion of the light guide or fixes the light guide (for example, Patent Literature 9, and Patent Literature 10).

CITATION LIST

Patent Literature

Patent Literature 1: Unexamined Japanese Patent Application Kokai Publication No. 2017-85670 (in particular, refer to FIG. 9)

Patent Literature 2: Unexamined Japanese Patent Application Kokai Publication No. 2010-277940 (in particular, refer to FIG. 1)

Patent Literature 3: Unexamined Japanese Patent Application Kokai Publication No. 2007-184186 (in particular, refer to FIG. 1)

Patent Literature 4: Unexamined Japanese Patent Application Kokai Publication No. 2016-178374 (in particular, refer to FIG. 7)

Patent Literature 5: Unexamined Japanese Patent Application Kokai Publication No. 2009-21158 (in particular, refer to FIG. 2)

Patent Literature 6: International Publication No. WO2013/114720 (in particular, refer to FIG. 14)

Patent Literature 7: Unexamined Japanese Patent Application Kokai Publication No. 2008-140726 (in particular, refer to FIGS. 4 and 7)

Patent Literature 8: Unexamined Japanese Patent Application Kokai Publication No. 2009-65244 (in particular, refer to FIG. 1)

Patent Literature 9: Unexamined Japanese Patent Application Kokai Publication No. 2015-73264 (in particular, refer to FIGS. 1 and 7)

Patent Literature 10: Unexamined Japanese Patent Application Kokai Publication No. 2015-195152 (in particular, refer to FIG. 1)

SUMMARY OF INVENTION

Technical Problem

However, since a conventional light guide efficiently irradiates light on an object to be read (object to be irradiated), the conventional light guide has the following problems. Light guides including configurations disclosed in Patent Literature 1 and Patent Literature 6 suffer from a lack of consideration for light emitted from the vicinity of the end face of the light guide. A light guide including configurations disclosed in Patent Literature 2 has a problem of complex structure due to a requirement that an inclined surface is required to be formed over the entire length in the longitudinal direction of the light guide. Since a light guide including a configuration disclosed in Patent Literature 3 changes in curvature of a light emission surface in a main scanning direction, the light emitted from a region close to a plane spreads out, and lighting efficiency of the light guide suffers. Light guides including configurations disclosed in Patent Literatures 4 and 5 have a problem that, as a distance from an end face from which light enters increases, the diameters of the light guides gradually increase, so that the lengths of the light guides in the longitudinal direction become long.

Further, a light guide configured as disclosed in Patent Literature 7 improves optical characteristics in the vicinity of an end face (light incident surface) by arranging concavo-convex portions on the light emission surface in the vicinity of the end face (light incident surface) and scattering light at the concavo-convex portions. However, the light guide configured as disclosed in Patent Literature 7 has a structure in which the concavo-convex portions are formed on the light emission surface extending in the longitudinal direction of the light guide, and scatters the light in a transverse direction crossing the longitudinal direction. Therefore, there is a problem in that the light emitted from the light guide spreads and the lighting efficiency may decrease. In addition, light guides including configurations disclosed in Patent Literature 8, Patent Literature 9, and Patent Literature 10 are developed with the objective of suppressing leakage light and supporting the light guides in the longitudinal direction, and such light guides suffer from a lack of consideration of the efficiency of the light emission from the vicinity of the end face of the light guide.

The present disclosure is achieved to solve the above-described problems, and an objective of the present disclosure is to obtain a light guide and an image reading apparatus that can efficiently irradiate light emitted from a light emission surface on an object to be read (an object to be irradiated).

Solution to Problem

A light guide according to the present disclosure includes:
a rod-shaped light guide main body extending in a longitudinal direction;
a first end face that is an end face of the light guide main body along a transverse direction crossing the longitudinal direction;
a light scattering pattern formed on the light guide main body along the longitudinal direction, the light scattering pattern scattering light that enters the light scattering pattern from the first end face and is guided inside the light guide main body; and
a light emission surface portion formed on the light guide main body along the longitudinal direction, the light emission surface portion being a surface from which the light scattered at the light scattering pattern is emitted to outside the light guide main body after being reflected on a wall surface of the light guide main body,
wherein the light emission surface portion includes a first light emission surface and a second light emission surface;
the first light emission surface is disposed near the first end face in the longitudinal direction; and
the second light emission surface is contiguous with the first light emission surface in the longitudinal direction,
a width of the first light emission surface in the transverse direction is shorter than a width of the second light emission surface in the transverse direction.

Advantageous Effects of Invention

According to the present disclosure, since the width of the first light emission surface in the transverse direction is shorter than the width of the second light emission surface in the transverse direction, an amount of light emitted from vicinity of the first end face is limited. Therefore, the light guide and the image reading apparatus can be obtained that can easily make the light emitted from the light guide nearly uniform in the longitudinal direction without decreasing the irradiation efficiency.

DESCRIPTION OF EMBODIMENTS

Embodiment 1

Figure 1:
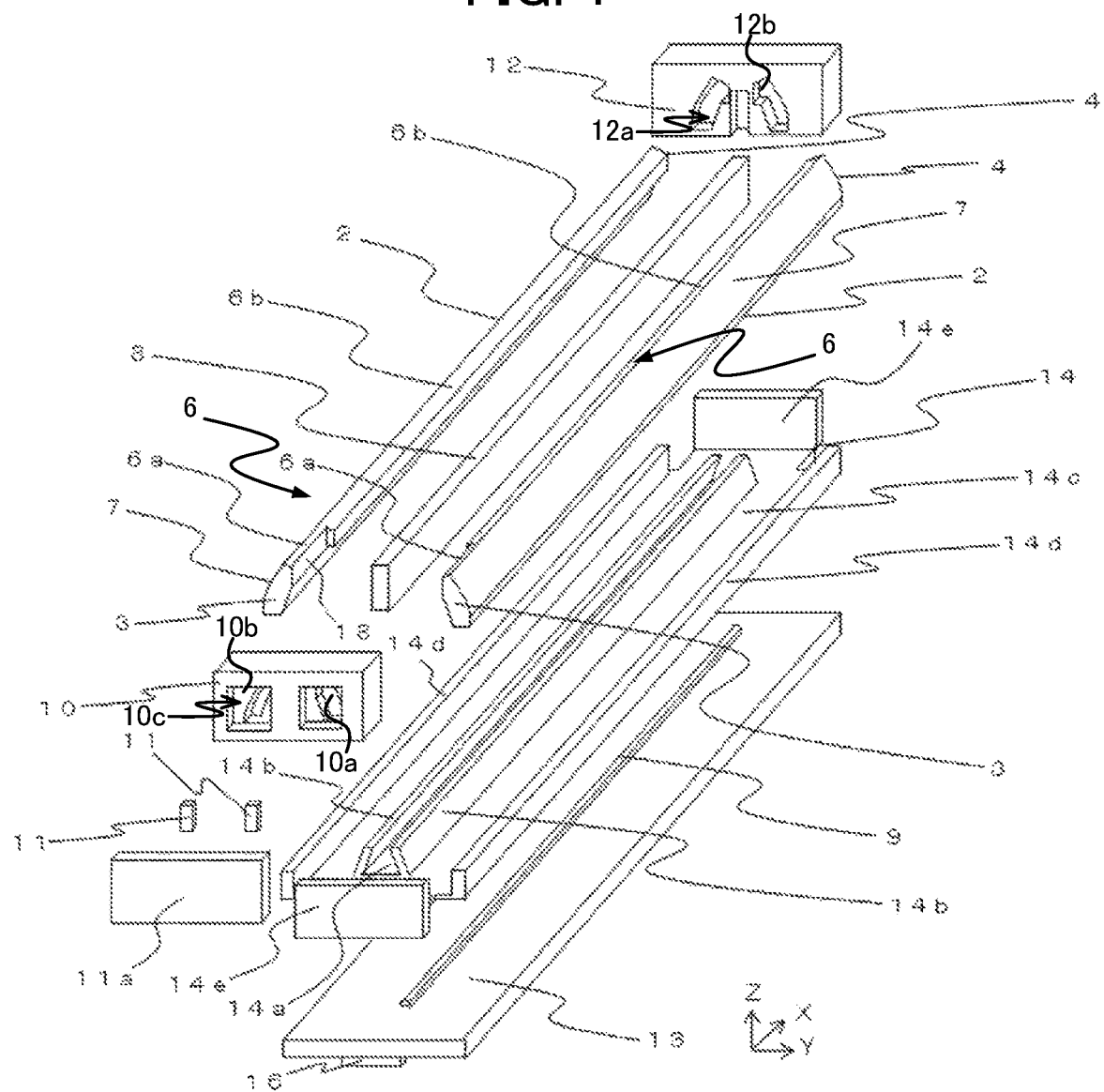
FIG. 1 is an exploded perspective view of an image reading apparatus (perspective view of a light guide according to Embodiment 1) according to Embodiment 1 of the present disclosure.

Hereinafter, an image reading apparatus according to Embodiment 1 of the present disclosure is described with reference to FIGS. 1 to 7. Note that a light guide according to Embodiment 1 and a lighting device described below are included in the image reading apparatus according to Embodiment 1. Light guides and lighting devices according to Embodiments 2 and 3 are included in image reading apparatuses according to Embodiments 2 and 3. Likewise, light guides and lighting devices according to Embodiments 4 and 5 are included in image reading apparatuses according to Embodiments 4 and 5.

In FIGS. 1 to 7, an object 1 to be irradiated (an object 1 to be read) is image information of a manuscript, a printed material, paper currencies, securities, and other general documents including sheet-like objects such as film. The object 1 to be irradiated (the object 1 to be read) is an object to be irradiated with light emitted from the light guide according to Embodiment 1, and the object 1 to be read (the object 1 to be irradiated) is an object whose image information is read by the image reading apparatus according to Embodiment 1.

In all the embodiments including Embodiment 1, a direction in which the object 1 to be read (the object 1 to be irradiated) is conveyed is assumed to be a carrying direction, and a direction intersecting (preferably orthogonal to) the carrying direction is assumed to be a main scanning direction of the image reading apparatus. Therefore, the carrying direction can also be termed a sub-scanning direction of the image reading apparatus. A space in which the object 1 to be read (object 1 to be irradiated) is conveyed is referred to as a conveyance path. Further, a direction intersecting, preferably orthogonal to, both the main scanning direction and the sub scanning direction is a reading depth direction of the image reading apparatus. The main scanning direction, the sub-scanning direction and the reading depth direction for the image reading apparatus correspond to the longitudinal direction, the transverse direction and the height direction, respectively, of the light guide. In FIGS. 1 to 7, by using three axes that are an X axis, Y axis and Z axis, the main scanning direction (longitudinal direction), the sub-scanning direction (transverse direction) and the reading depth direction (height direction) are expressed as the X axis direction, the Y axis direction and the Z axis direction, respectively. The origin of the X axis is a center of the main scanning direction length of the image reading apparatus. The origin of the Y axis is a center of the sub scanning direction length of the image reading apparatus. The origin of the Z axis is set as a conveyance position of the object 1 to be read (object 1 to be irradiated) read by the image reading apparatus.

In FIGS. 1 to 7, a light guide main body 2 is a main portion of a rod-shaped light guide extending in the longitudinal direction. A first end face 3 is one end face of the light guide main body 2 along the transverse direction intersecting the longitudinal direction. A second end face 4 is another end face of the light guide main body 2 along the transverse direction. The first end face 3 and the second end face 4 oppose each other in the longitudinal direction. A light scattering pattern 5 is formed in the light guide main body 2 along the longitudinal direction and scatters light that enters from the first end face 3 and is guided inside the light guide main body 2. The light scattering pattern 5 is formed on a side surface of the light guide main body 2 between the first end face 3 and the second end face 4. The light scattering pattern 5 may be formed to the first end face 3 and/or the second end face 4, that is, over entire side face of the light guide main body 2. Alternatively, the light scattering pattern 5 may be formed by providing a space from the first end face 3 and/or from the second end face 4.

In FIGS. 1 to 7, a light emission surface portion 6 is formed on the light guide main body 2 along the longitudinal direction, and is a surface from which the light scattered at the light scattering pattern 5 is emitted to outside the light guide main body 2 after being reflected on a wall surface of the light guide main body 2. The light emission surface portion 6 includes a first light emission surface 6a that is disposed near the first end face 3 in the longitudinal direction, and a second light emission surface 6b that is contiguous with the first light emission surface a in the longitudinal direction. A width of the first light emission surface 6a in the transverse direction is shorter than a width of the second light emission surface 6b in the transverse direction. Here, the width of the light emission surface portion 6 (the first light emission surface 6a, the second light emission surface 6b) in the transverse direction means a width of the light emission surface portion 6 viewed as a plain. For the sake of convenience, an expression "a width on a surface in the transverse direction" is used. This expression is used since the width on the surface in the transverse direction means a width of the XY plane, in plain view. That is because the relationship between the width of the first light emission surface 6a and the width of the first second light emission surface 6b does not change on a surface in the transverse direction, even though the surface of the light emission surface portion 6 is inclined with respect to the transverse direction. Note that the XY plane means a plane extending along both of the mutually-orthogonal X axis direction and Y axis direction.

Figure 2:
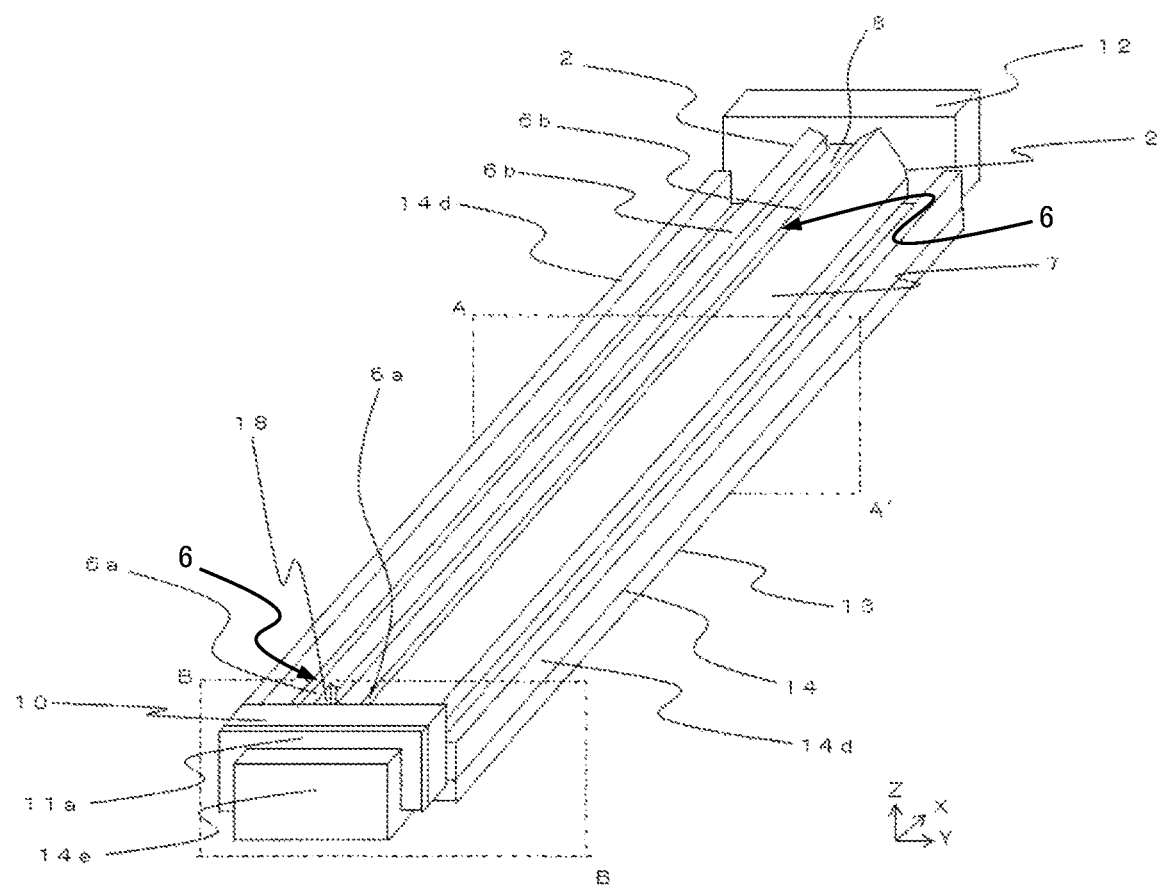
FIG. 2 is a perspective view of the image reading apparatus according to Embodiment 1 of the present disclosure.
Figure 3:
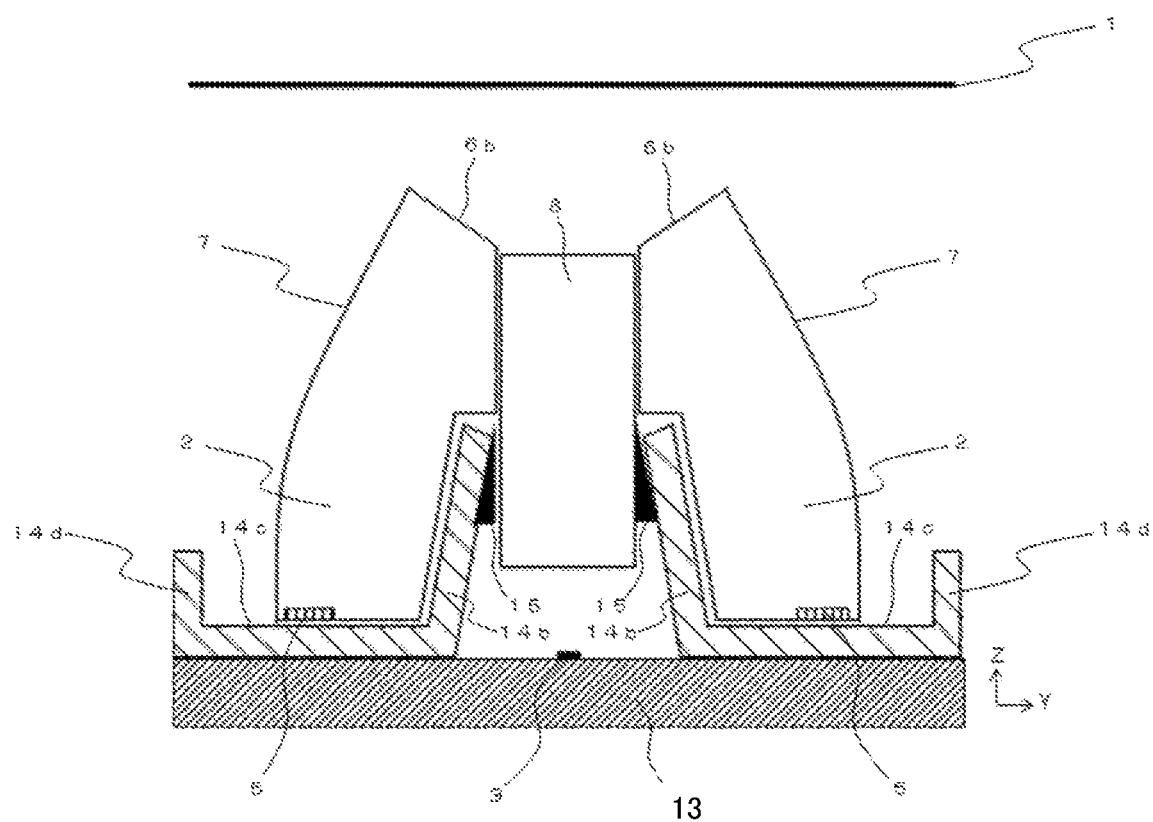
FIG. 3 is a cross-sectional view of the image reading apparatus according to Embodiment 1 of the present disclosure.
Figure 4:
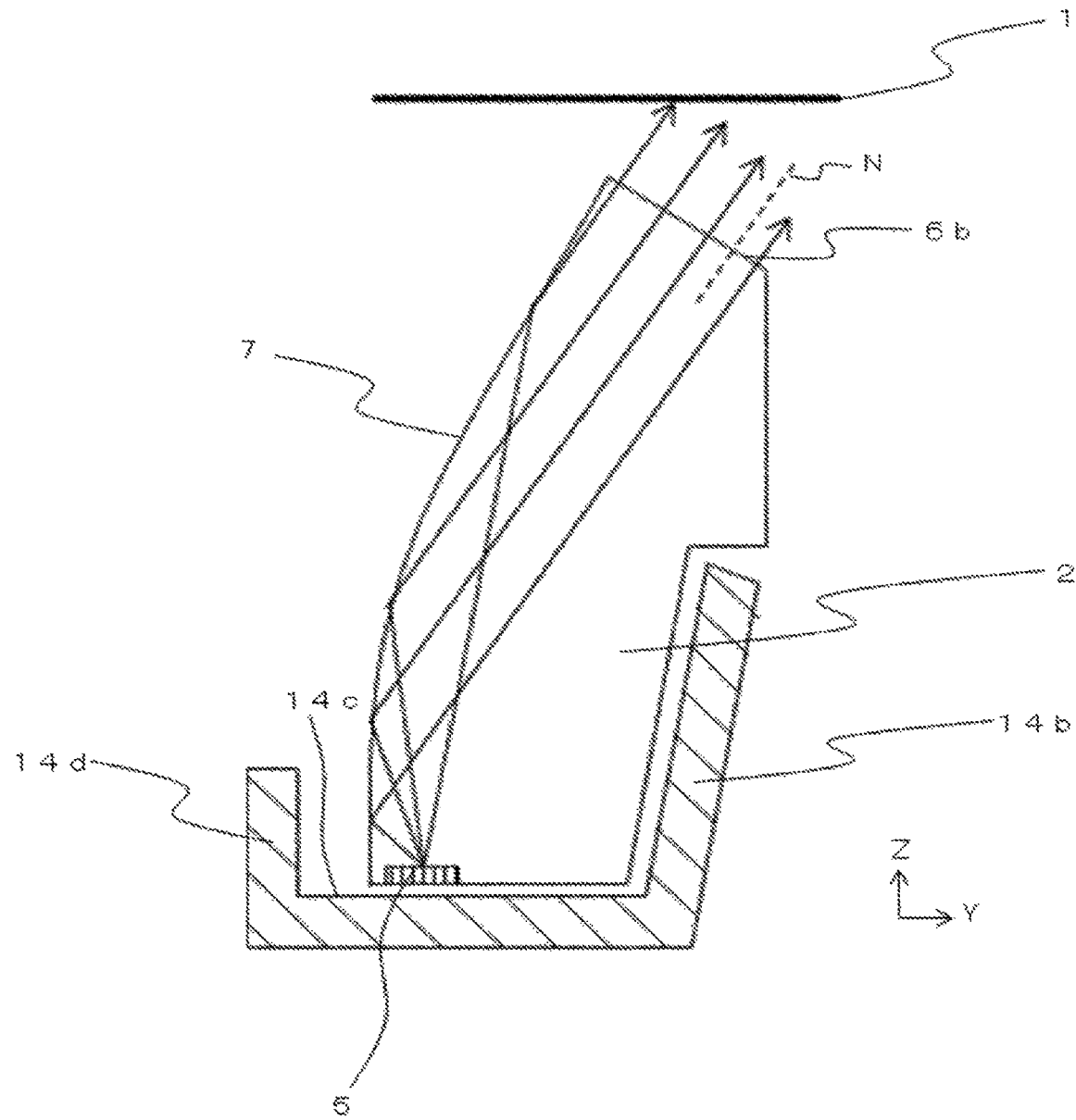
FIG. 4 is a schematic diagram regarding guiding light in the image reading apparatus according to Embodiment 1 of the present disclosure (light guide according to Embodiment 1)
Figure 5:
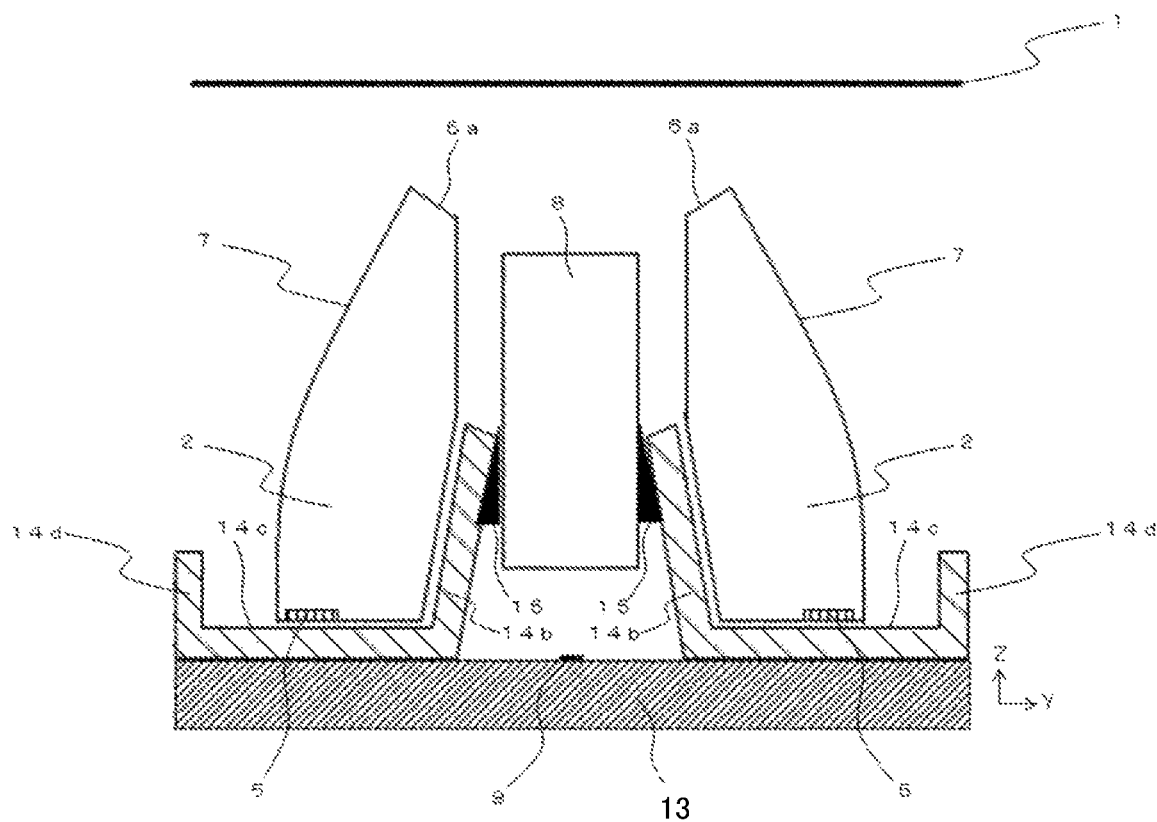
FIG. 5 is a cross-sectional view of the image reading apparatus according to Embodiment 1 of the present disclosure.
Figure 6:
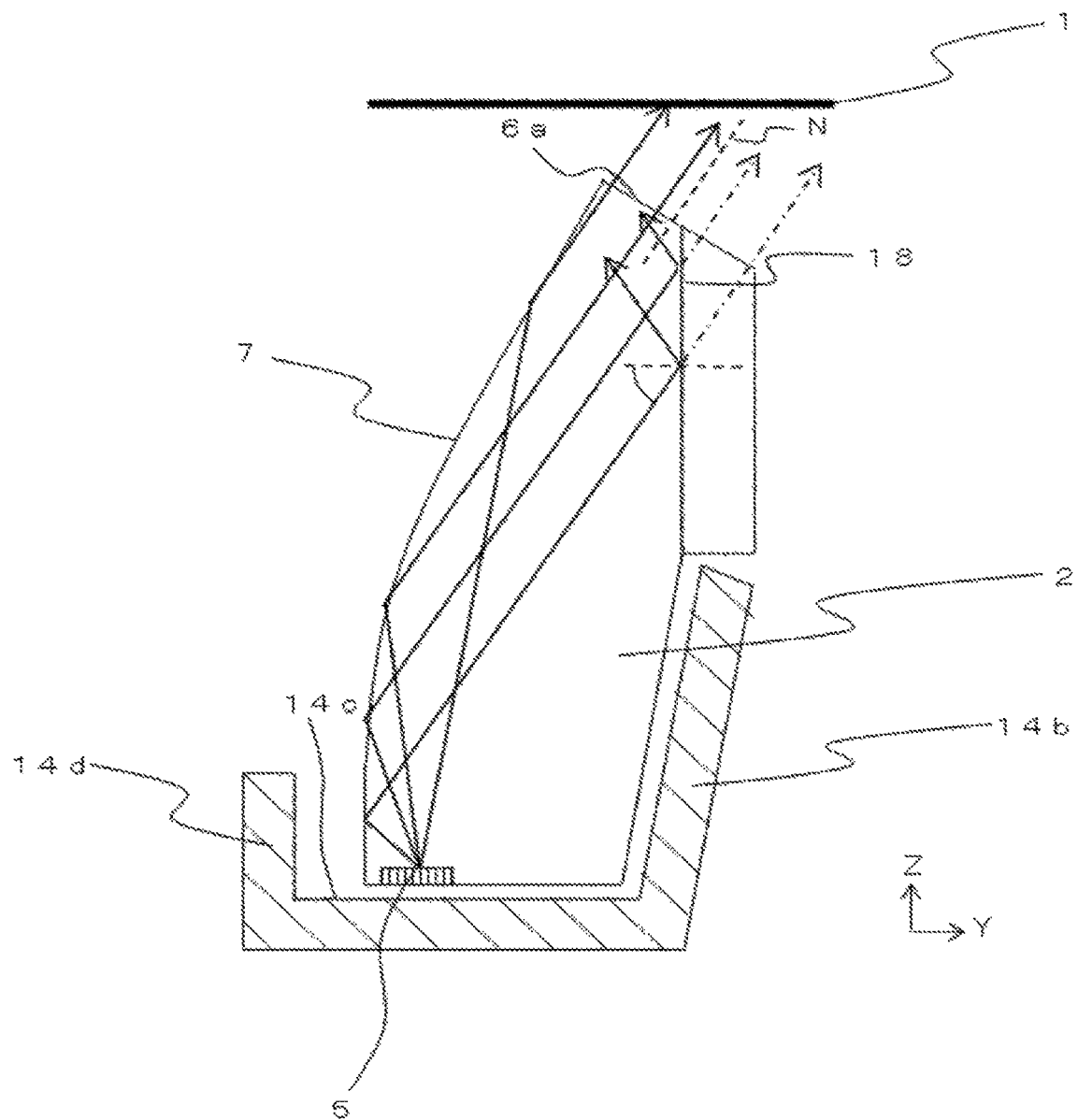
FIG. 6 is a schematic diagram regarding guiding light of the image reading apparatus according to Embodiment 1 of the present disclosure (light guide according to Embodiment 1)

In FIGS. 1 to 7, a paraboloidal surface 7 is a wall surface of the light guide main body 2 contiguous with the light emission surface portion 6, and a cross section of the paraboloidal surface 7 along the transverse direction is parabolic. The light scattering pattern 5 is formed at a focal point of the paraboloidal surface 7 in the cross section taken along the transverse direction. On the cross section taken along the transverse direction, the light emission surface portion 6 is formed along a straight line, and the optical axis direction of the light reflected on the paraboloidal surface 7 is parallel to the normal direction of the cross section (straight line portion) along the transverse direction. In FIG. 4 and FIG. 6, a normal line N of the light emission surface portion 6 is indicated by a broken line. Also in other figures, the normal line N is a broken line that indicates the normal line of the light emission surface portion 6 that is a plane.

As illustrated in FIGS. 1 to 4, the image reading apparatus according to Embodiment 1 includes two light guides according to Embodiment 1. More specifically, in the image reading apparatus according to Embodiment 1, the light guide main body 2 of one of the two light guides and the light guide main body 2 of another one of the two light guide are arranged to face each other outwardly directing the paraboloidal surfaces 7 on a cross section along the transverse direction. A rod lens array 8 extending in the longitudinal direction is disposed between the light guide main body 2 of one of the two light guides and the light guide main body 2 of another one of the two light guide, and converges light emitted from the light emission surface portion 6 and reflected by the object 1 to be read. A light receiving element array 9 receives the light converged by the rod lens array 8. Another separate imaging optical system such as a microlens array 8 may be used for the rod lens array 8. In that case, not only a lens array 8 (in many cases, an erecting equal-magnification optical system lens body) such as the rod lens array 8 and the microlens array 8 extending in the main scanning direction (longitudinal direction) but also a reduction optical system lens body may be used. Therefore, it is sufficient that the image reading apparatus simply includes an imaging lens body 8.

As illustrated in FIG. 1, a light guide holder 10 holds the light guide main body 2, and includes an opening portion 10a and a through hole portion 10b that is contiguous with the opening portion 10a. The light guide holder 10 is disposed in the light guide main body 2 at one end in the longitudinal direction. The opening portion 10a is for inserting the first end face 3 with at least a portion of the first light emission surface 6a exposed. In a portion in which the first light emission surface 6a is inserted through the through hole portion 10b via the opening portion 10a, the first light emission surface 6a does not function as the light emission surface portion 6. Thus, this portion can be made function as a rotation suppressing portion 6a of the light guide main body 2, rather than as the first light emission surface 6a.

At least a portion of the first light emission surface 6a is made to function as the rotation suppressing portion 6a on the assumption that the opening portion 10a has a shape matching an outer shape of the light guide main body 2. Also, in the portion in which the first light emission surface 6a is inserted through the through hole portion 10b via the opening portion 10a, without forming the first light emission surface 6a in the light guide main body 2, the first light emission surface 6a may be formed only in a portion exposed from the opening portion 10a. Since light is not emitted as a result regardless of the presence or absence of the function of preventing the light guide main body 2 from rotating, the rotation suppressing portion 6a can be said to be a light non-emission surface 6a. Therefore, the light emission surface portion 6 can be said to include the light non-emission surface 6a contiguous with the first end face 3 between the first end face 3 and the first light emission surface 6a. The light non-emission surface 6a also includes a case in which, once the emitted light is reflected by the light guide holder 10 (the through hole portion 10b), the light then returns to the light guide main body 2. That is, two cases are included, a case in which light exits from the surface of the light non-emission surface 6a itself, and a case in which the surface of the light non-emission surface 6a is light-shielded.

The through hole portion 10b allows light to pass between a side in which the first end face 3 is inserted in the opening portion 10a and the opposite side. The opposite side may be configured as an opening portion 10c. In other words, the through hole portion 10b connects the opening portion 10a and the opening portion 10c. A light source 11 is installed on a side opposite to the side in which the first end face 3 is inserted in the opening portion 10a. Since the through hole portion 10b functions as a light blocking portion, the light non-emission surface 6a is formed. The through hole portion 10b in this case is described as a second light blocking portion 10b in more detail in Embodiments 4 and 5.

The light source 11 is a light source element such as an LED and/or an organic electro-luminescence (EL) element. The light source 11 is formed on a light source substrate 11a. The light source substrate 11a is a substrate on which the light source 11 is mounted. The light source 11 and the light source substrate 11a may be referred to as a light source. The light source substrate 11a and the light guide holder 10 oppose each other, and the light from the light source 11 propagates through the opening portion 10c to the through hole portion 10b. A part or the whole of the light source 11 may be inserted into the inside of the through hole portion 10b by closely attaching together the light source substrate 11a and the light guide holder 10.

The light emitted from the light source 11 enters the light guide main body 2 from the first end face 3 through the through hole portion 10b. In order to efficiently transmit the light emitted from the light source 11 to the first end face 3 and to return the light leaked from the first end face 3 back to the light guide main body 2, a color having high reflectance such as a white color is preferable for the through hole portion 10b. In response to image information of the object 1 to be read (the object 1 to be irradiated), light sources that emit red light (R), green light (G), blue light (B), white light (WH), ultraviolet light (UV), infrared light (IR) and the like are used for the light source 11. A plurality of light sources 11 may be provided, and lights with a plurality of wavelengths may be emitted simultaneously or at different times.

A set of the light source 11 and the light guide main body 2 or a set of the light guide holder 10, the light source 11, and the light guide main body 2 may be the lighting device according to Embodiment 1. Further, the set of the light guide holder 10, the light source 11, and the light guide main body 2 may be configured as the light guide according to Embodiment 1. Alternatively, a set of the light guide holder 10 and the light guide main body 2 may be configured as the light guide according to Embodiment 1. Of course, the set of the light source 11 and the light guide main body 2 may be configured as the light guide according to Embodiment 1. This similarly applies to other embodiments.

Whereas the first end face 3 is inserted into the light guide holder 10, the second end face 4 is configured to be inserted in a light guide holder 12. The light guide holder 12 holds the light guide main body 2, and includes an opening portion 12a and a hole portion 12b contiguous with the opening portion 12a. The light guide holder 12 is provided at another end of the light guide main body 2 in the longitudinal direction. That is, the light guide holder 12 is provided at an end of the light guide main body 2 opposite to the end on the side where the light guide holder 10 is provided. The second end face 4 is inserted into the opening portion 12a. The hole portion 12b includes a wall surface on the side opposite to the side where the first end face 3 is inserted in the opening portion 12a and the hole portion 12b is not penetrated. The second end face 4 may be disposed in contact with or near the wall surface of the hole portion 12b. In order to return light leaked from the second end face 4 to the light guide main body 2 again, a color having high reflectance such as a white color is preferable for the hole portion 12b and the wall surface of the hole portion 12b. Although not illustrated, rather than the wall surface of the hole portion 12b, but an opening portion 12c similar to the opening portion 10c may be formed. However, preferably, the light leaking from the second end face 4 should be returned to the light guide main body 2 again by blocking the opening portion 12c using a white plate or the like. Of course, instead of blocking with the white plate, the light source substrate 11a may be arranged to block the opening portion 12c and light may be sent from the light source 11 to the hole portion 12b.

That is, the light guide holder 12 may be identical to the light guide holder 10 or have the same structure as the light guide holder 10. Specifically, the light guide holder 12 holds the light guide main body 2, and includes the opening portion 12a and a through hole portion 12b contiguous with the opening portion 12a. The light guide holder 12 is provided at another end of the light guide main body 2 in the longitudinal direction. The second end face 4 is inserted in the opening portion 12a by exposing at least a part of a third light emission surface 6c described later. The third light emission surface 6c described later has a similar function as the first light emission surface 6a. In a portion in which the third light emission surface 6c is inserted through the through hole portion 12b via the opening portion 12a, the third light emission surface 6c does not function as the light emission surface portion 6. Thus, this portion can be made to function not as the third light emission surface 6c, but rather as the rotation suppressing portion 6b of the light guide main body 2. The rotation suppressing portion 6b includes a similar function as the rotation suppressing portion 6a.

With reference to FIGS. 1 and 2, the details of the image reading apparatus and the light guide according to Embodiment 1 are further described. FIG. 1 is an exploded perspective view of the image reading apparatus. Since the exploded perspective view illustrates a disassembled state, the shape of the light guide is exposed. FIG. 2 is a perspective view of the image reading apparatus that is assembled from the disassembled state as illustrated in FIG. 1. The light guide main body 2 of the light guide according to Embodiment 1 illustrated in FIG. 1 is, for example, formed of resin or glass. Therefore, the light guide main body 2 (light guide) can also be referred to as a transparent body 2. The light guide main body 2 extends in the main scanning direction (longitudinal direction), and the first end face 3 is formed at an end in the longitudinal direction. The light source 11 is arranged to face the first end face 3. The light emitted from the light source 11 enters the inside of the light guide main body 2 from the first end face 3, propagates in the longitudinal direction, and is guided.

The light guide main body 2 includes a flat surface extending in the longitudinal direction on one side in the height direction. The flat surface includes the light scattering pattern 5 formed in the longitudinal direction. The light scattering pattern 5 includes a scattering region of a predetermined length in the transverse direction. The light guide main body 2 includes, on the other side of the height direction, the light emission surface portion 6 extending in the longitudinal direction that emits light to the outside of the light guide main body 2. The light guide main body 2 includes a side surface connecting the flat surface and the light emission surface portion 6 and extending in the longitudinal direction. This side surface has a parabolic shape and is also a reflection surface that reflects light from the light scattering pattern 5 to the light emission surface portion 6.

The imaging lens body 8 illustrated in FIGS. 1 and 2 is the rod lens array 8 in which a plurality of rod lenses are arrayed in the longitudinal direction. The imaging lens body 8 is arranged between the object 1 to be irradiated (object 1 to be read) and a sensor substrate 13 (signal processing substrate 13). The imaging lens body 8 is held by a holding member 15 such as an adhesive 15 and/or a tape 15 to a frame 14. The imaging lens body 8 has a function of focusing (converging) the light emitted from the lighting device (the light emission surface portion 6 of the light guide main body 2) and reflected by the object 1 to be read, and forming an image on a light receiving element 9.

As described above, although FIGS. 1 and 2 illustrate an example in which the reflected light enters the imaging lens body 8, a configuration may be used in which transmitted light enters the imaging lens body 8. That is, functions of the imaging lens body 8 may be said to include focusing (converging) the light emitted from the lighting device (the light emission surface portion 6 of the light guide main body 2) and transmitted through the object 1 to be read, and forming an image on the light receiving element 9. The light guide (lighting device) according to Embodiment 1 is preferably disposed on the opposite side of the imaging lens body 8 with respect to the object 1 to be irradiated (object 1 to be read). Of course, when the object 1 to be irradiated (the object 1 to be read) is not being conveyed, the light guide (lighting device) according to Embodiment 1 and the imaging lens body 8 may be said to face each other across the conveyance path. Many image reading apparatuses are set to align an optical axis of the light guide main body 2 with an optical axis of the imaging lens body 8 (when the imaging lens body 8 is a lens of the reduction optical system, an optical axis of a first mirror to which the light from the object 1 to be irradiated (the object 1 to be read) first arrives, that is the Z axis. Also, two of the image reading apparatuses according to Embodiment 1 may oppose each other across the conveyance path. In this case, the two image reading apparatuses in cooperation with each other may be said to form an image reading system according to Embodiment 1.

The light receiving element 9 receives the light focused (converged) by the imaging lens body 8, and photoelectrically converts the light to output an electric signal. A light receiving portion, other driving circuitry, and the like formed of a semiconductor chip and/or the like are mounted on the light receiving element 9. The light receiving element 9 can also be said to be a sensor IC 9. In FIGS. 1 and 2, since the imaging lens body 8 uses the rod lens array 8, the light receiving element 9 (sensor IC 9) becomes a light receiving element array 9 in which a plurality of semiconductor chips are arrayed in the main scanning direction. When the imaging lens body 8 is a lens of the reduction optical system, the number of the light receiving element 9 is one, or a small number in comparison to the light receiving element array 9. The light receiving element array 9 (light receiving element 9) is formed on the sensor substrate 13. The frame 14 disposed between the sensor substrate 13 and the imaging lens body 8 is preferably formed of resin, sheet metal or the like. The frame 14 blocks light incident on the light receiving element 9 from the outside of the image reading apparatus, and also has a dustproof effect for preventing dust and the like from entering the light receiving element 9.

The frame 14 includes a frame flat surface portion 14c that includes a frame opening portion 14a extending in the longitudinal direction, the frame flat surface portion 14c extending in the longitudinal direction, a pair of frame inclined portions 14b arranged in a standing manner towards the object 1 to be read side at an end portion on the side of the frame opening portion 14a of the frame flat surface portion 14c in the transverse direction, and a frame side wall portion 14d vertically arranged towards the object 1 to be read side at an end portion on the opposite side of the frame opening portion 14a of the frame flat surface portion 14c in the transverse direction. The pair of frame inclined portions 14b is inclined in such a way that distances of the frame opening portion 14a in the transverse direction becomes narrower towards the side of the object 1 to be read. That is, the pair of frame inclined portions 14b includes a gap extending in the longitudinal direction.

Holder attachment portions 14e are formed in the same plane as the frame flat surface portion 14c at both end portions of the frame flat surface portion 14c. The light source substrate 11a and the light guide holder 10 are disposed between one of the holder attachment portions 14e and the light guide main body 2 in order from the one of the holder attachment portion 14e side, and the holder attachment portion 14e fixes the light source substrate 11a and the light guide holder 10. The light guide holder 10 in which the light guide main body 2 is inserted is fixed to the holder attachment portion 14e of the frame 14 using a tape, an adhesive, a screw, or the like. The light guide holder 10 is preferably formed of white resin or the like. The other one of the holder attachment portions 14e fixes the light guide holder 12 by disposing the light guide holder 12 between the other one of the holder attachment portions 14e and the light guide main body 2. The light guide holder 12 in which the light guide main body 2 is inserted is fixed to the holder attachment portion 14e of the frame 14 using a tape, an adhesive, a screw, or the like. The light guide holder 12 is preferably formed of white resin or the like.

Note that when the light source substrate 11a is fixed also to the light guide holder 12 side, the light guide holder 12 and the light guide holder 10 have the same configuration. That is, the light source substrate 11a is installed on the surface of the light guide holder 12 (the light guide holder 10) opposite to the surface on the side where the light guide main body 2 is inserted. At this time, the light source 11 is disposed at a position corresponding to the opening portion 12c (the opening portion 10c) of the light guide holder 12 (the light guide holder 10), and faces the second end face 4 of the light guide main body 2 (the first end face 3).

The relationship between the light guide main body 2 and the frame 14 to be fixed by the light guide holder 10 is described below. In FIG. 2, in the light guide main body 2, the flat surface on which the light scattering pattern 5 is formed is arranged to face the frame flat surface portion 14c of the frame 14. In the transverse direction, the light guide main body 2 is disposed so as to be interposed between the frame inclined portion 14b and the frame side wall portion 14d. At this time, a side surface (reflection surface) of the light guide main body 2 is arranged on the frame inclined portion 14b side. The two light guide main bodies 2 are disposed symmetrically to the optical axis (the reading depth direction) of the imaging lens body 8 (rod lens array 8) with the imaging lens body 8 interposed therebetween. The rod lens array 8, which is the imaging lens body 8, is inserted into the gap between the pair of frame inclined portions 14b, and is held by the pair of frame inclined portions 14b using an adhesive member 15 such as an adhesive or a tape.

Electronic components such as the light receiving element 9, an external connector 16, and the signal processing IC 17 (Application Specific Integrated Circuit (ASIC) 17) are installed on the sensor substrate 13. The signal processing IC 17 (ASIC 17) cooperates with a Central Processing Unit (CPU) 17a and a Random Access Memory (RAM) 17b and performs signal processing of photoelectric conversion output and the like received from the light receiving element 9. The CPU 17a, the RAM 17b, and a signal processing circuit 17c of the ASIC 17 are collectively referred to as a signal processing unit 18. The sensor substrate 13 is fixed to the frame 14 with a tape, an adhesive, a screw, or the like. The sensor substrate 13 is fixed to a surface of the frame flat surface portion 14c of the frame 14, the surface being opposite to a surface on which the light guide main body 2 is disposed. At this time, the optical axis of the imaging lens body 8 is aligned with the light receiving portion of the light receiving element 9. In other words, the light receiving portion is disposed on the optical axis of the imaging lens body 8. The external connector 16 formed on the sensor substrate 13 of the image reading apparatus is used for the photoelectric conversion output of the light receiving element 9 and for an input/output signal interface including the signal processing output of the photoelectric conversion output.

Next, with reference to FIGS. 3 to 6, the light guide body according to Embodiment 1, that is, the light guide main body 2 is described in detail. FIG. 3 is a cross-sectional view of the image reading apparatus of an area surrounded by a dot-and-dash line AA' illustrated in FIG. 2. FIG. 4 is a schematic diagram regarding light guiding of the light guide illustrated in FIG. 3. FIG. 5 is a cross-sectional view of the image reading apparatus of an area surrounded by a dot-and-dash line BB' illustrated in FIG. 2. FIG. 6 is a schematic diagram regarding guiding light of the light guide illustrated in FIG. 5. The dot-and-dash line AA' shows a cross section in the vicinity of the center of the light guide main body 2 including the second light emission surface 6b of the light guide main body 2. The dot-and-dash line BB' shows a cross section in the vicinity of the first end face 3 including the first light emission surface 6a of the light guide main body 2. The cross section illustrated in the dot-and-dash line AA' and the cross section illustrated in the dot-and-dash line BB' can be referred to as a YZ plane. Note that the YZ plane means a plane extending along both of the mutually-orthogonal Y axis and Z axis directions.

In FIG. 1, FIG. 2, FIG. 5, and FIG. 6, an outer shape of the first light emission surface 6a and an outer shape of the second light emission surface 6b that are contiguous to each other are stepped. This step is caused by a recessed portion 18. FIG. 6 is a drawing viewed in the longitudinal direction to clarify the step due to the recessed portion 18. The stepped portion is not illustrated in the cross section. The light guide main body 2 includes a recessed portion 18 and the width of the first light emission surface 6a in the transverse direction is set by an area of the light emission surface portion 6 being limited by the recessed portion 18. From the shape of the recessed portion 18, the recessed portion 18 appears to be formed by cutting out the light guide main body 2. Thus, the recessed portion 18 may be referred to as a cut-out portion 18. Of course, the cut-out portion 18 may be formed by actually cutting out the light guide main body 2.

First, with reference to FIG. 3 and FIG. 4, the light emitted from the light emission surface portion 6 including the second light emission surface 6b is described. FIG. 4 is a view schematically indicating a main part of the periphery of one of the two light guide main bodies 2 of FIG. 3. In FIG. 4, a plurality of arrows indicates light rays and indicates directions of the light rays, respectively. The light guide main body 2 includes the light scattering pattern 5 on the flat surface on the frame 14 side. The flat surface of the light guide main body 2 extends in the longitudinal direction. That is, the light scattering pattern 5 is also formed in the longitudinal direction. The light scattering pattern 5 includes a scattering region of a predetermined length in the transverse direction. The light scattering pattern 5 is formed by a fine uneven surface, an embossed surface, silk printing or the like, reflects or refracts light propagating (being guided) inside the light guide main body 2 in the longitudinal direction, and changes the propagation direction of the light so as to irradiate the object 1 to be read.

When the light scattering pattern 5 changes the light propagation direction to irradiate the object 1 to be read, the light scattering pattern 5 acts as the second light source. Thus, even if the light source 11 deteriorates with age and the color tint and the light emission amount change, the entire longitudinal direction changes in the same way. Therefore, An arrayed light source includes, in place of the light scattering pattern 5, a plurality of point light sources (in most cases, the elements are LEDs) arranged in the longitudinal direction, and makes the light enter the light guide main body portion 2 from the position on which the light scattering pattern 5 is formed. Unlike this arrayed light source, in case of the light scattering pattern 5, brightness and/or color tone does not change only in a specific area due to deterioration with age. Further, in the light scattering pattern 5, there are cases in which light that not only reflects but also transmits through the light guide main body 2 is present. For this reason, the frame flat surface portion 14c of the frame 14 disposed under (outer side of) the light scattering pattern 5 is preferably formed of a high reflectance member such as white resin or a metal, and such the light scattering pattern 5 can return the light that transmitted through the light scattering pattern 5, or other parts of the light guide main body 2, to the inside of the light guide main body 2. Therefore, efficient lighting can be performed.

In FIGS. 3 and 4, the light guide main body 2 includes the flat-shaped light emission surface portion 6 (second light emission surface 6b) on the side opposite to the flat surface on which the light scattering pattern 5 is formed. The light emission surface portion 6 (the second light emission surface 6b) extends in the longitudinal direction. The light guide main body 2 includes a side surface connecting the flat surface and the light emission surface portion 6 between the flat surface on which the light scattering pattern 5 is formed and the light emission surface portion 6. The side surface extends in the longitudinal direction, and the shape thereof seen in the YZ plane is parabolic and is a reflecting surface of light. The light scattering pattern 5 is formed at the focal point of the paraboloidal surface 7 in the YZ plane.

Light entering from the first end face 3 of the light guide main body 2 propagates and is guided in the light guide main body 2 and is reflected by the light scattering pattern 5. Among the light reflected by the light scattering pattern 5, light reflected towards the light emission surface portion 6 side is further reflected by the paraboloidal surface 7 and travels towards the light emission surface portion 6. When the light scattering pattern 5 is formed at the focal point of the paraboloidal surface 7, the light reflected by the paraboloidal surface 7 becomes parallel light rays and travels to the light emission surface portion 6. The light emission surface portion 6 is a flat surface, and the normal direction of the plane of the light emission surface portion 6 and the direction of the parallel light rays reflected by the paraboloidal surface 7 are the same. In other words, the normal direction of the plane of the light emission surface portion 6 and the direction of the parallel light reflected by the paraboloidal surface 7 are parallel. Therefore, the parallel light rays directed to the light emission surface portion 6 are mostly not reflected to the inside of the light guide main body 2 at the light emission surface portion 6, and almost all the parallel light rays are emitted from the light emission surface portion 6 to the outside of the light guide main body 2 and illuminate the object 1 to be read.

In the paraboloidal surface 7 of the light guide main body 2, when the curvature of the parabolic shape decreases and a reflection angle of the light from the light scattering pattern 5 on the paraboloidal surface 7 increases, light leaks from the paraboloidal surface 7 to the outside of the light guide main body 2. In order to suppress this leakage light, the paraboloidal surface 7 may be made be a mirror surface by performing metal vapor deposition or the like on the outside of the side surface that is the paraboloidal surface 7.

Next, the light irradiated from the light emission surface portion 6 including the first light emission surface 6a is described with reference to FIGS. 5 and 6. FIG. 6 is a view schematically expressing a main part of the periphery of one of the two light guide main bodies 2 of FIG. 5. In FIG. 6, a plurality of arrows indicates light rays and indicates directions of the light rays, respectively. FIG. 6 is also a cross-sectional view of the light guide main body 2 at the side end portion of the light source 11 in the YZ plane. When the light enters the first end face 3 from the light source 11 and directly enters the light scattering pattern 5, and the light reflected by the light scattering pattern 5 (hereinafter direct reflection light) reaches in the vicinity of a longitudinal direction end of the light guide main body 2, an area with high illuminance tends to be specifically generated and the optical characteristics tend to deteriorate.

Such a tendency for deterioration of optical characteristics to occur in the vicinity of the end portion of the light guide main body 2 in the longitudinal direction can be easily suppressed in the light guide (lighting device, image reading apparatus) according to Embodiment 1. Specifically, the direct reflection light can be blocked from emitting from the light emission surface portion 6 (the first light emission surface 6a) by changing an angle of the light emission surface portion 6 on the side of the first end face 3 in the YZ plane to form the recessed portion 18 to be the first light emission surface 6a. In other words, the reason that the emission of direct reflection light can be blocked is because the width of the first light emission surface 6a in the transverse direction is narrower than the width of the second light emission surface 6b in the longitudinal direction. In the YZ plane, the recessed portion 18 appears to be a straight surface. Since the first light emission surface 6a (the recessed portion 18) may be formed only in an area where the optical characteristics tend to deteriorate, when the length of the first light emission surface 6a and the second light emission surface 6b in the longitudinal direction are compared, the length of the first light emission surface 6a becomes shorter. In order to block the direct reflection light emitted from the light emission surface portion 6 (the first light emission surface 6a), an angle J formed by the surface of the recessed portion 18 and the direct reflection light is preferably configured as an angle such that the parallel light rays are totally reflected by the paraboloidal surface 7 (in the case of a transparent resin, 40 degrees or more). In the recessed portion 18 illustrated in FIGS. 5 and 6, the transverse direction width is set to be 1 mm and the longitudinal direction width is set to be about 10 mm.

The light guide (lighting device, image reading apparatus) according to Embodiment 1 includes:

the rod-shaped light guide main body 2 extending in the longitudinal direction;

the first end face 3 that is an end face of the light guide main body 2 along the transverse direction;

the light scattering pattern 5 formed in the light guide main body 2 along the longitudinal direction, the light scattering pattern 5 scattering light that enters from the first end face 3 and is guided inside of light guide main body 2; and the light emission surface portion 6 formed in the light guide main body 2 along the longitudinal direction, the light emission surface portion 6 being a surface from which the light scattered at the light scattering pattern 5 emits outside the light guide main body 2 after being reflected on a wall surface of the light guide main body 2.

Furthermore, the light emission surface portion 6 includes:

the first light emission surface 6a that is disposed near the first end face 3 in the longitudinal direction; and the second light emission surface 6b contiguous with the first light emission surface 6a in the longitudinal direction.

The width of the first light emission surface 6a in the transverse direction is shorter than the width of the second light emission surface 6b in the transverse direction.

Therefore, since the light rays irradiated on the object 1 to be read from the first light emission surface 6a and the second light emission surface 6b of the light guide main body 2 are parallel light rays, even if a distance between the object 1 to be read and the image reading apparatus is changed, the brightness of the lighting illuminating the object 1 to be read does not change. Therefore, highly stable lighting with deep lighting depth can be achieved. In addition, since the width of the first light emission surface 6a in the transverse direction is set to be shorter than the width of the second light emission surface 6b in the transverse direction, the direct reflection light that worsens the optical characteristics is easily blocked to obtain uniform characteristics over the main scanning direction (longitudinal direction) by providing the recessed portion 18 in the light guide main body 2. The light guide according to Embodiment 1 forms the recessed portion 18 in the light guide main body 2 on the imaging lens body 8 side (the opposite side of the paraboloidal surface 7 side) in the transverse direction.

Figure 7:
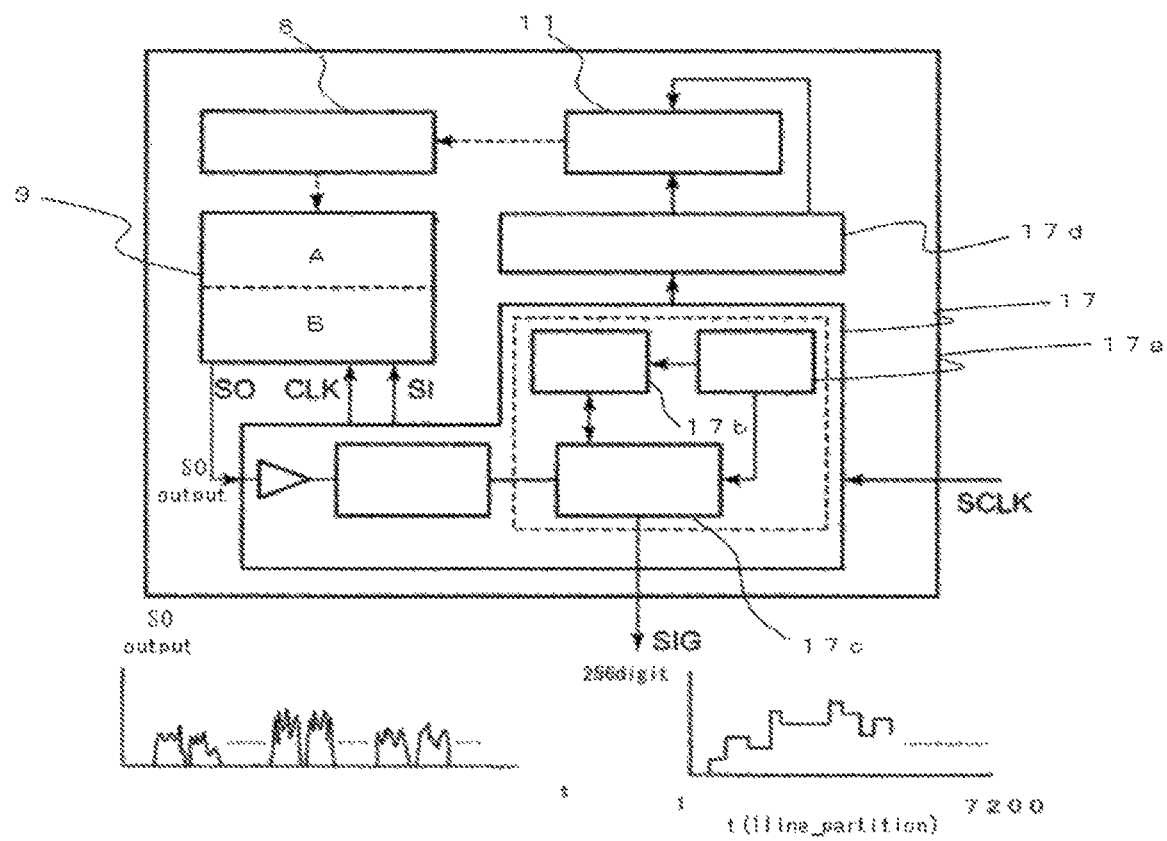
FIG. 7 is a functional block diagram illustrating a circuit configuration of the image reading apparatus according to Embodiment 1 of the present disclosure.

Here, the image reading operation of the image reading apparatus according to Embodiment 1 is described. FIG. 7 is a functional block diagram illustrating a circuit configuration of the image reading apparatus. Here, SCLK indicates a start clock signal, SO indicates a signal output, CLK indicates a clock signal, SI indicates a signal input, and SIG indicates image information (signal). The bottom left diagram of FIG. 7 shows the waveform of the signal output SO, and the horizontal axis is time t. The bottom right diagram of FIG. 7 shows the waveform (one line section) of the image information SIG output from the signal processing circuit 17c. First, the ASIC 17 cooperates with the CPU 17a and transmits a light source turn-on signal to a light source drive circuit 17d. Based on the received light source turn-on signal, the light source drive circuit 17d supplies power to each of the light sources 11 for a predetermined time. The light sources 11 emit light while power is being supplied. The light emitted from the light source 11 enters the light guide main body 2 from the first end face 3 of the light guide main body 2 and propagates (is guided), while repeating transmission or reflection, to reach the light scattering pattern 5 of the light guide main body 2. A portion of the light entered in the light scattering pattern 5 is reflected towards the reading depth direction (height direction), is emitted from the light emission surface portion 6 of the light guide main body 2 (the first light emission surface 6a and the second light emission surface 6b), and is irradiated on the object 1 to be read. The light irradiated on the object 1 to be read is reflected by the object 1 to be read, is concentrated by the imaging lens body 8 (image forming optical system 8), and an image is formed at the light receiving element 9. FIG. 7 exemplarily illustrates that the light receiving element 9 includes a light receiving portion (photoelectric conversion circuit) A and a driving circuit B.

The light guide (lighting device, image reading apparatus) according to Embodiment I includes the light guide main body 2 for guiding light entering from the light source 11 to the object 1 to be irradiated, and includes the recessed portion 18 that is a deformed shape for which a portion of the light emission surface portion 6, that emits the light entering the light guide main body 2 to the object 1 to be irradiated, is inclined from the incident angle of 90 degrees with respect to the optical axis.

Embodiment 2

Figure 8:
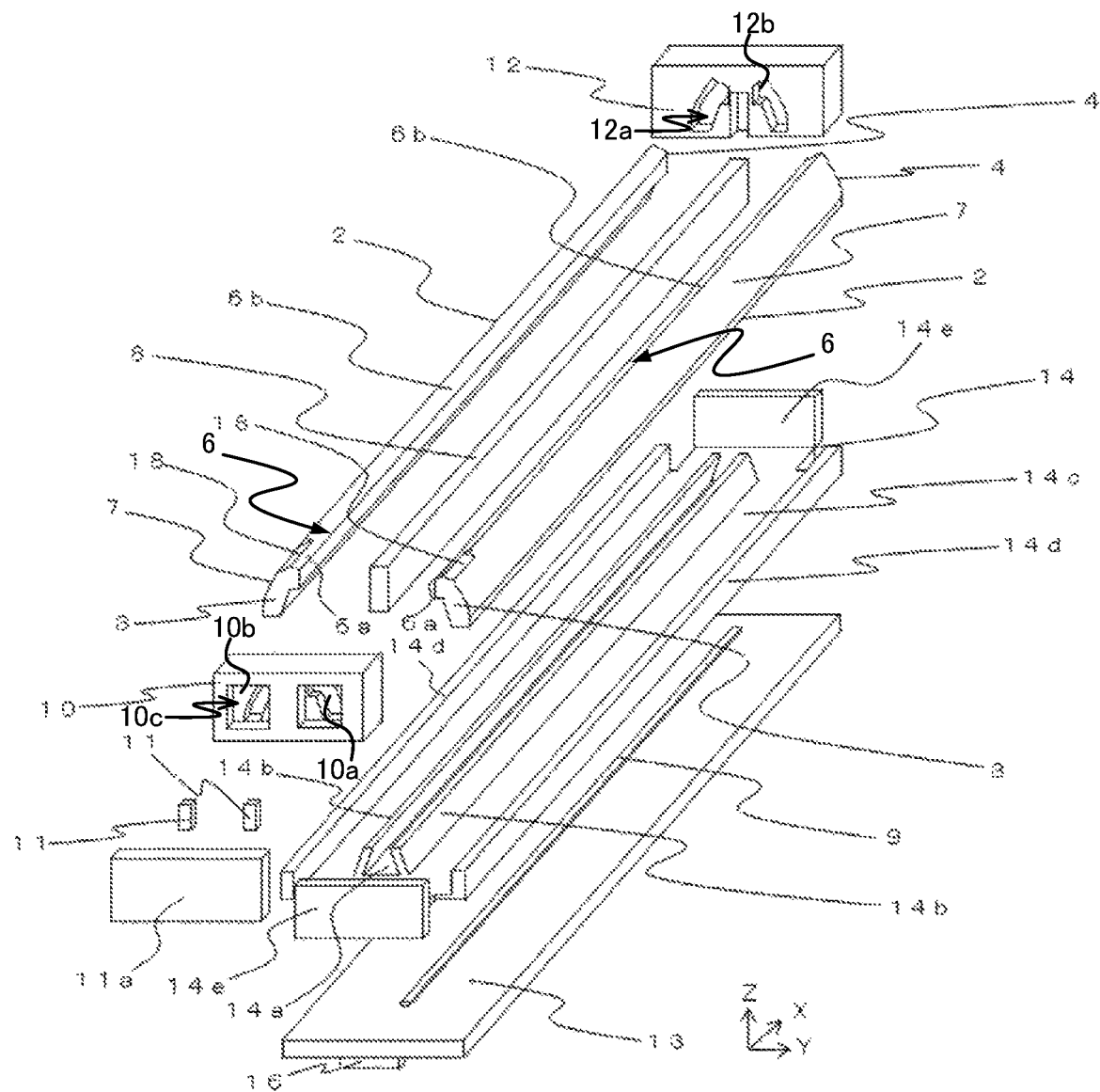
FIG. 8 is an exploded perspective view of an image reading apparatus according to Embodiment 2 of the present disclosure (a perspective view of a light guide according to Embodiment 2)
Figure 9:
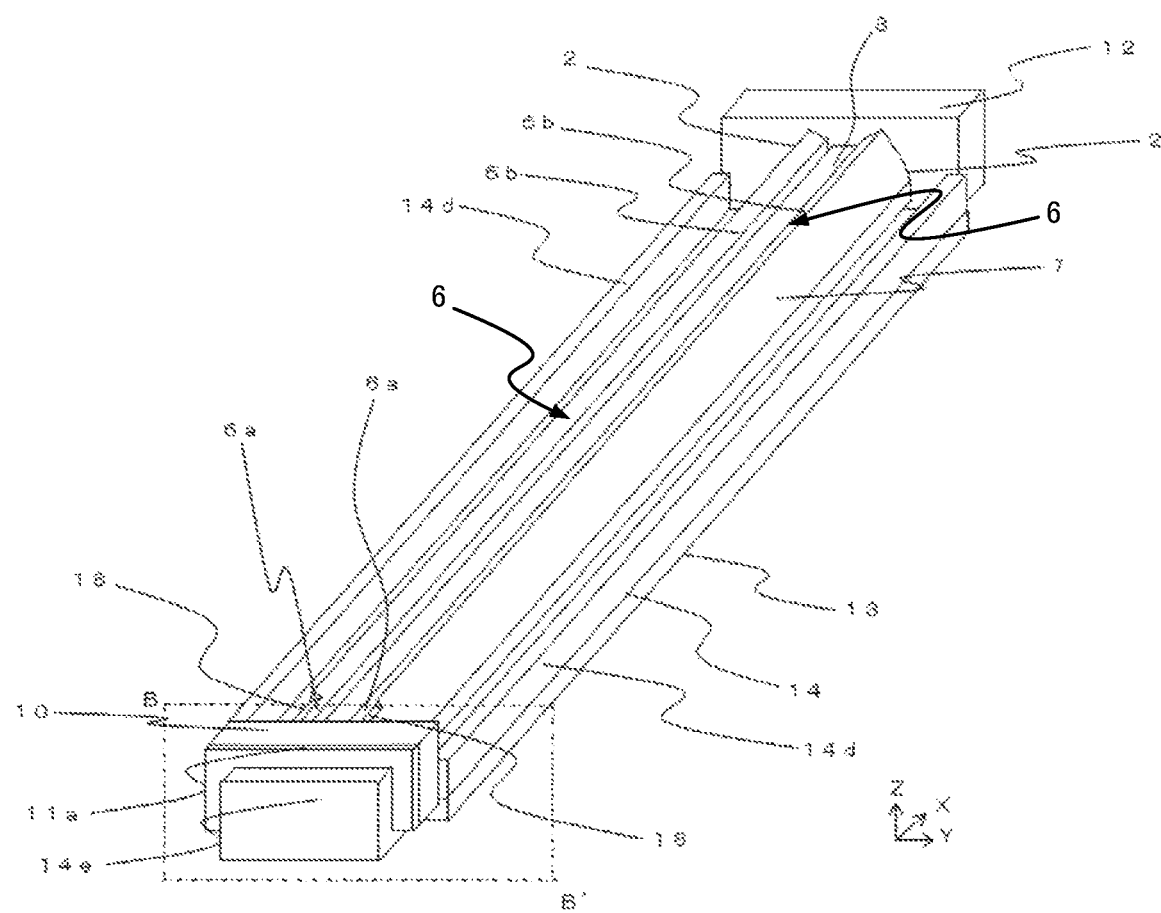
FIG. 9 is a perspective view of the image reading apparatus according to Embodiment 2 of the present disclosure.
Figure 10:
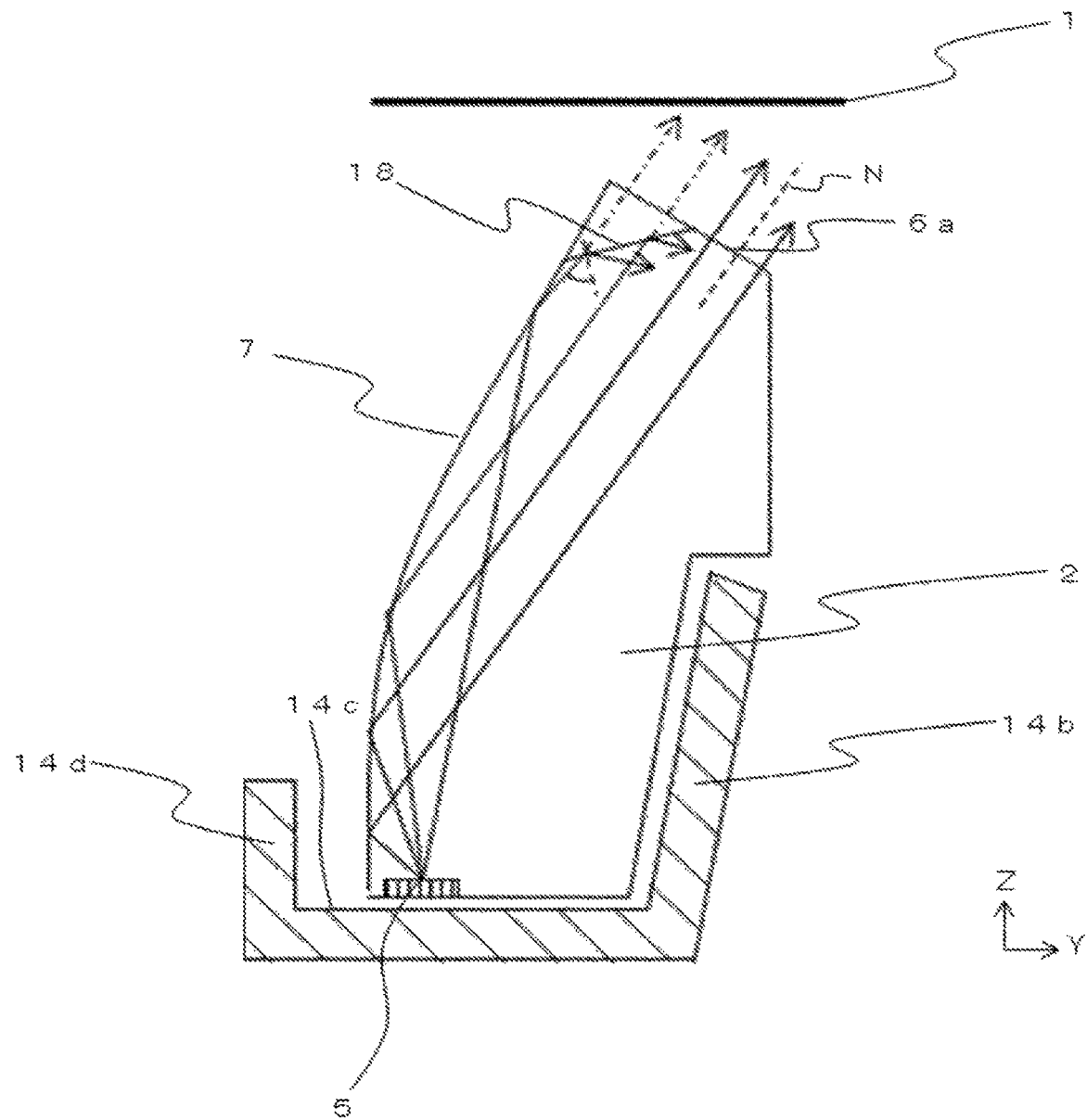
FIG. 10 is a schematic diagram regarding guiding light of the image reading apparatus according to Embodiment 2 of the present disclosure (light guide according to Embodiment 2)

Hereinafter, an image reading apparatus according to Embodiment 2 of the present disclosure is described with reference to FIGS. 8 to 10. The descriptions of the reference signs and the like are omitted for the configuration similar to that of Embodiment 1. FIGS. 8 to 10 correspond to FIG. 1, FIG. 2 and FIG. 6, respectively. Specifically, FIG. 8 is an exploded perspective view of the image reading apparatus (perspective view of a light guide). FIG. 9 is a perspective view of the image reading apparatus. FIG. 10 is a schematic explanatory view regarding guiding light of the image reading apparatus (light guide). FIG. 10 is a cross-sectional view of the image reading apparatus in an area surrounded by a dot-and-dash line BB' illustrated in FIG. 9.

The light guide according to Embodiment 1 is configured to block the unnecessary light entering a reading area of the object 1 to be read when the object 1 to be read is arranged near the light guide main body 2 by disposing the recessed portion 18 on the side of the imaging lens body 8 of the light guide main body 2. On the other hand, the light guide according to Embodiment 2 is configured to block the unnecessary light entering the reading area of the object 1 to be read when the object 1 to be read is placed at a position relatively far from the light guide main body 2.

As illustrated in FIGS. 8 to 10, in the light guide according to Embodiment 2, the recessed portion 18 is provided on the light guide main body 2 on the opposite side of the imaging lens body 8. That is, the recessed portion 18 is formed contiguously with the paraboloidal surface 7 on the side of the paraboloidal surface 7. Also in this case, by setting the angle $\Phi$ between the surface of the recessed portion 18 and the parallel light reflected by the paraboloidal surface 7 to be equal to or larger than 40 degrees, total reflection occurs, and light is not irradiated to the object 1 to be read. At this time, when the object 1 to be read is at a distant position, the light emitted from the upper part of the light guide main body 2 being blocked due to the total reflection reaches the reading area of the object 1 to be read. Therefore, when the installation position of the object 1 to be read is far, in the case in which the optical characteristics in the vicinity of the end portion of the light guide main body 2 in the longitudinal direction are deteriorated, the direct reflection light can be blocked, and therefore, uniform optical characteristics can be obtained over the entire main scanning direction.

A position of emitting the light that causes deterioration of the optical characteristics in the vicinity of the end portion of the light guide main body 2 in the longitudinal direction is changed by the installation position of the light source 11 and the position of the light guide main body 2. Hence, Embodiment 2 describes the case in which, when the object 1 to be read is placed at a relatively far position, the light that causes deterioration of the optical characteristics enters the reading area. That is, in the light guide according to Embodiment 1, the recessed portion 18 is formed in the light guide main body 2 on the imaging lens body 8 side (the side opposite to the paraboloidal surface 7 side) in the transverse direction. In contrast, in the light guide according to Embodiment 2, the recessed portion 18 is formed in the light guide main body 2 on the side opposite to the imaging lens body 8 (on the side of the paraboloidal surface 7) in the transverse direction. Of course, in order to make the width of the first light emission surface 6a in the transverse direction shorter than the width of the second light emission surface 6b in the transverse direction, the recessed portion 18 may be formed in the light guide main body 2 on the imaging lens body 8 side (the side opposite to the paraboloidal surface 7 side) and on the opposite side of the imaging lens body 8 (paraboloidal surface 7 side) in the transverse direction. In other words, both of the recessed portion 18 of the light guide according to Embodiment 1 and the recessed portion 18 of the light guide according to Embodiment 2 are formed.

Embodiment 3

Figure 11:
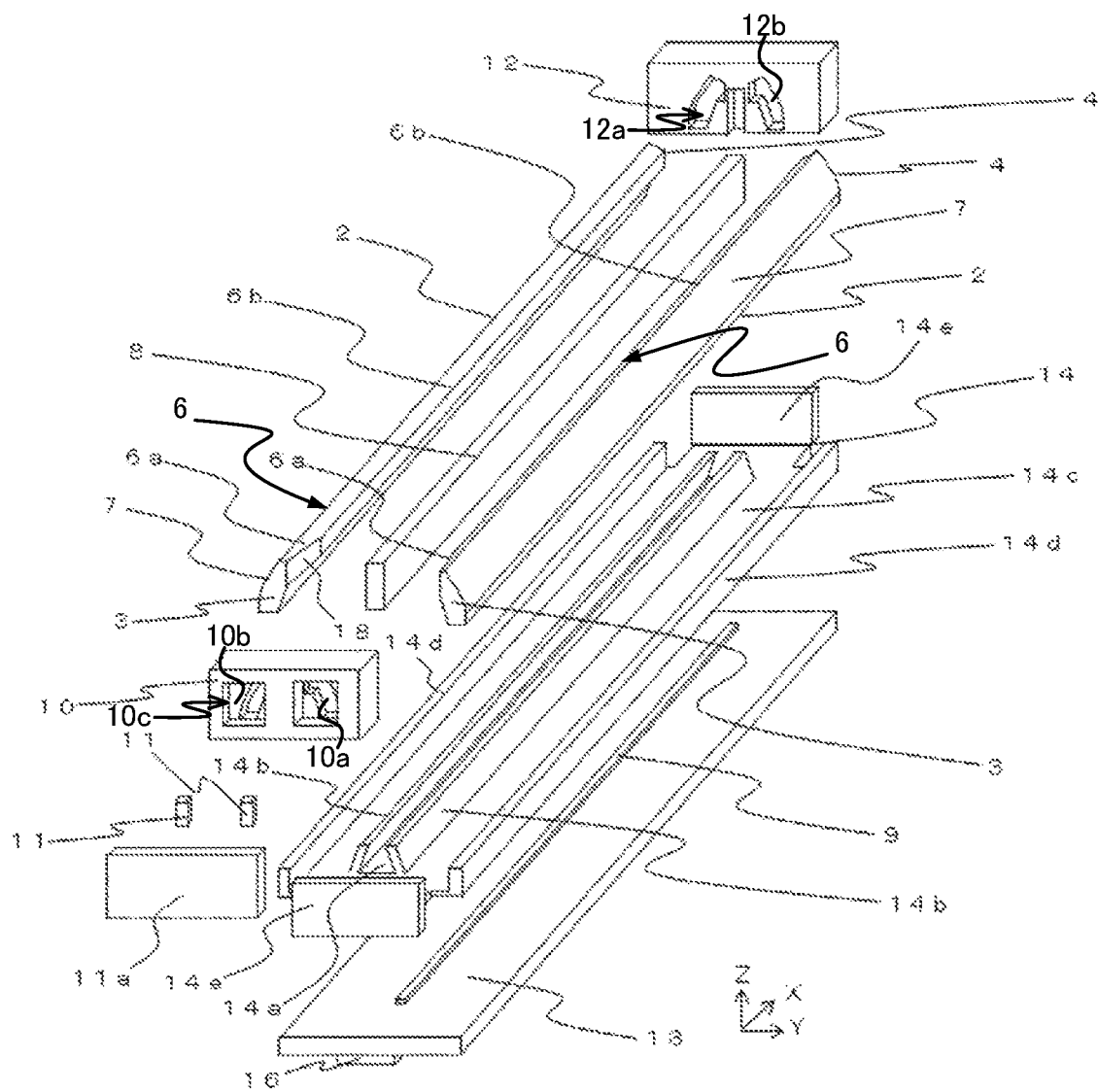
FIG. 11 is an exploded perspective view of an image reading apparatus according to Embodiment 3 of the present disclosure (a perspective view of a light guide according to Embodiment 3)
Figure 12:
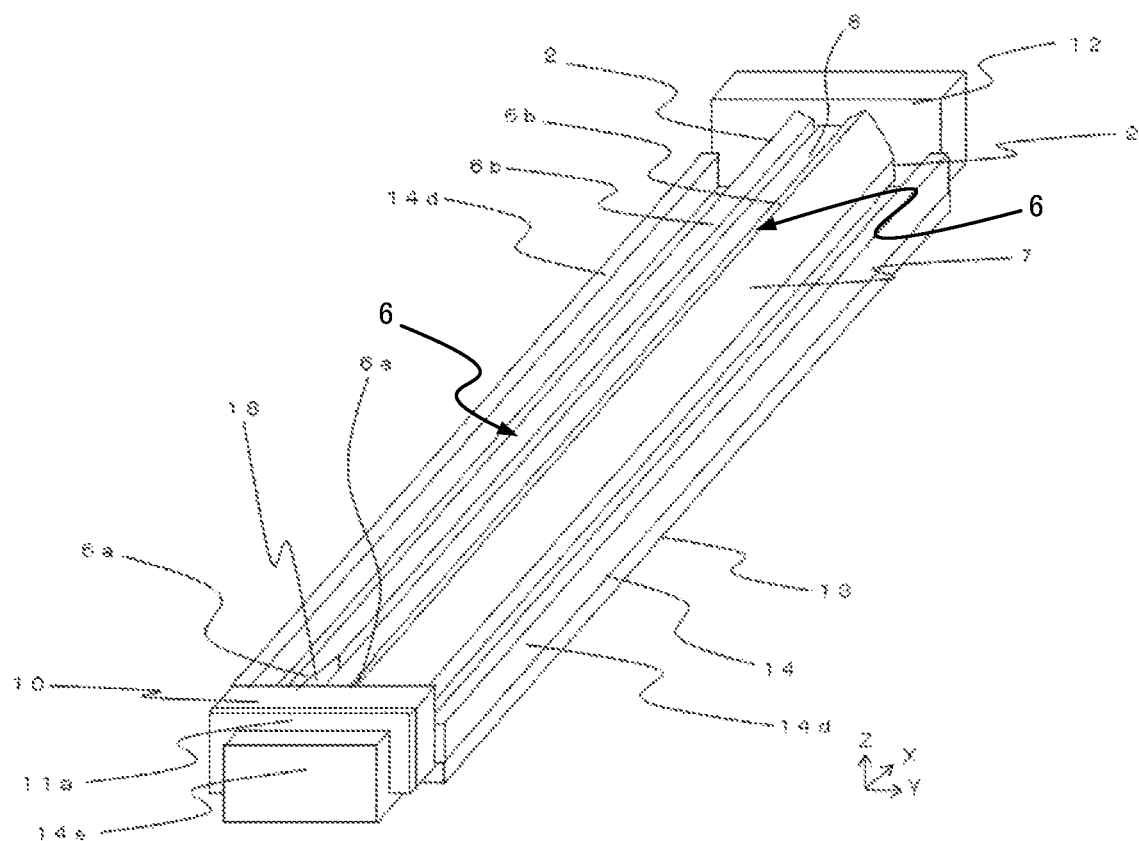
FIG. 12 is a perspective view of the image reading apparatus according to Embodiment 3 of the present disclosure.
Figure 13:
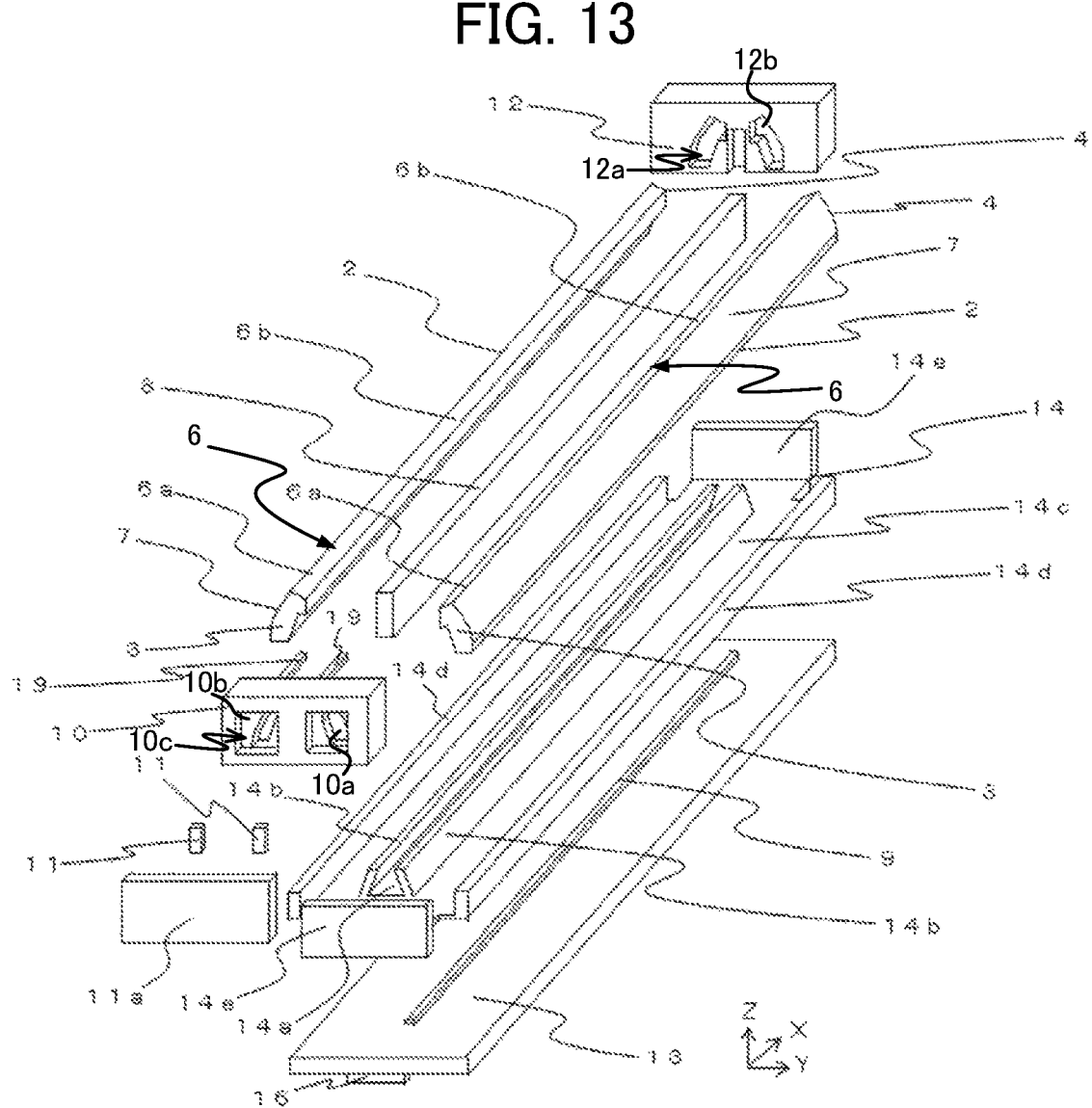
FIG. 13 is an exploded perspective view of an image reading apparatus according to Embodiment 4 of the present disclosure (perspective view of a light guide according to Embodiment 4)
Figure 14:
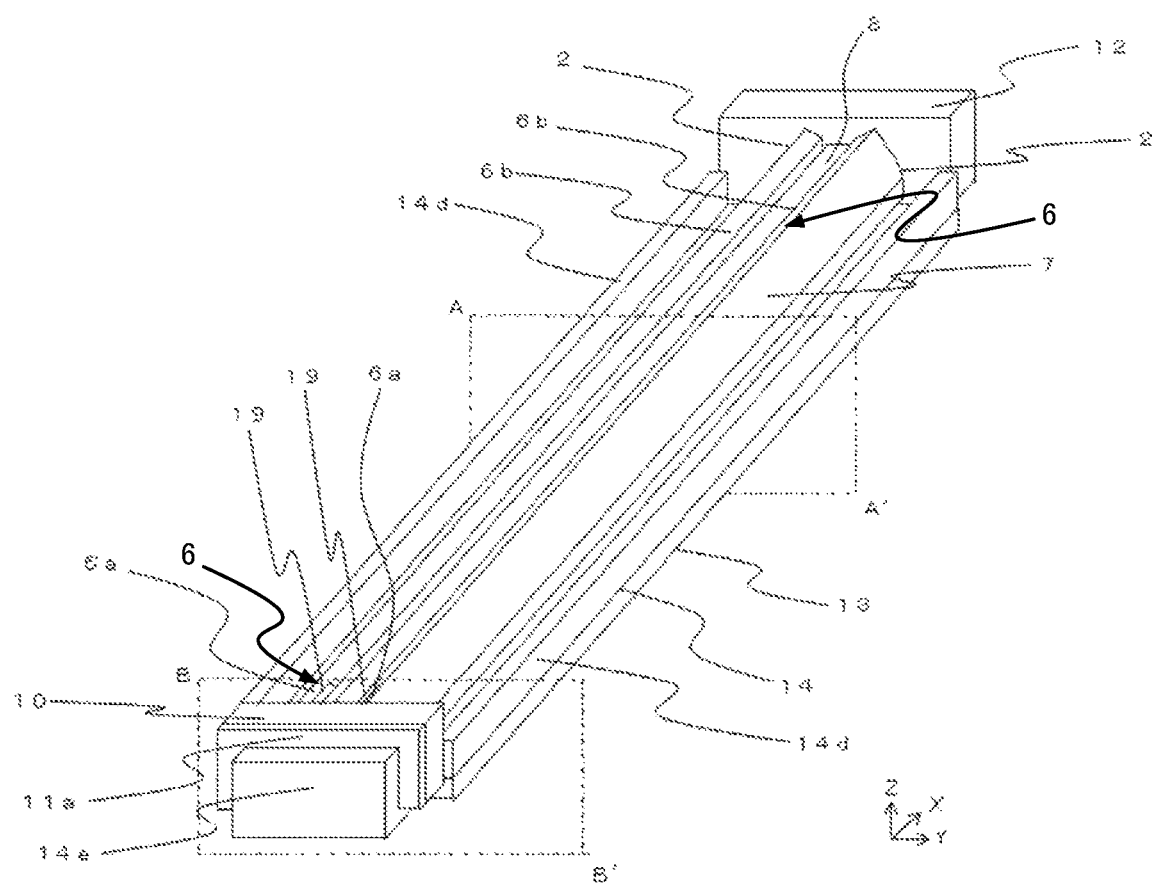
FIG. 14 is a perspective view of the image reading apparatus according to Embodiment 4 of the present disclosure.

Hereinafter, an image reading apparatus according to Embodiment 3 of the present disclosure is described with reference to FIGS. 11 and 12. The descriptions of the reference signs and the like are omitted for the configurations similar to those of the Embodiments 1 and 2. FIGS. 11 and 12 correspond to FIGS. 1 and 2, respectively. Specifically, FIG. 11 is an exploded perspective view of an image reading apparatus (perspective view of the light guide). FIG. 12 is a perspective view of the image reading apparatus. A recessed portion 18 of the light guide according to Embodiment 3 is formed with a portion in which at least one of an outer shape of the first light emission surface 6a and an outer shape of the second light emission surface 6b being stepped are smoothed, the outer shape of the first light emission surface 6a and the outer shape of the second light emission surface 6b being contiguous to each other. At least one of the outer shape of the first light emission surface 6a and the outer shape of the second light emission surface 6b may be tapered, the outer shape of the first light emission surface 6a and the outer shape of the second light emission surface 6b being contiguous to each other, or alternatively, the entire recessed portion 18 may be tapered. Further, the recessed portion 18 may be stepped except for the contiguous portion. Conversely, the contiguous portion may be stepped.

In the light guides according to Embodiment 1 and Embodiment 2, the recessed portions 18 have similar shapes in any YZ plane. However, in the light guide according to Embodiment 3, as shown in FIGS. 11 and 12, the recessed portion 18 may be narrowed in a tapered manner as the distance from the first end face portion 3 (light source 11) decreases in the longitudinal direction. In other words, the width of the first light emission surface 6a in the transverse direction narrows in a tapered manner as the recessed portion 18 moves closer to the first end face 3. In addition, such widening may not be in a divergent manner but may be stepped. In FIGS. 11 and 12, the recessed portion 18 is shown in the same position as in Embodiment 1, but the recessed portion 18 in Embodiment 3 may be in the same position as in Embodiment 2. Of course, the recessed portion 18 may be formed in the light guide main body 2 both on the imaging lens body 8 side (opposite side of the paraboloidal surface 7 side) and on the opposite side of the imaging lens body 8 (the paraboloidal surface 7 side) in the transverse direction. The light guide according to Embodiment 3 is a case in which the width of the recessed portion 18 in the transverse direction changes. On the other hand, in the cases of Embodiments 1 and 2, the width of the recessed portion 18 in the reading depth direction (height direction) changes.

In the light guides according to Embodiments 1 and 2, since the width in the transverse direction of the light emission surface portion 6 abruptly changes between the region including the recessed portion 18 and the region without the recessed portion 18, a rare case occurs in which an amount of light emitted from the recessed portion 18 decreases and a level difference occurs in illuminance in the main scanning direction. A certain amount of illuminance level difference can be suppressed by adjusting reflectance by changing width and shape of the light scattering pattern 5. However, when reflectance adjustment is difficult, the recessed portion 18 of the light guide according to Embodiment 3 is preferable. In other words, as illustrated in FIGS. 11 and 12, the width of the recessed portion 18 (the first light emission surface 6a) is contiguously varied in the longitudinal direction. That is, by adjusting the width of the recessed portion 18 (the first light emission surface 6a) provided in the light guide main body 2 in the longitudinal direction, the change in the illuminance that is lowered by the recessed portion 18 can be smoothed. Therefore, there is no sudden change in illuminance and the light scattering pattern 5 can be easily designed.

In Embodiments 1 through 3, the example in which the recessed portion 18 is formed according to the shape of the light guide main body 2 is described so far. However, the first light emission surface 6a may be formed by shielding a portion of the light emission surface portion 6 without changing the cross-sectional shape of the light guide main body 2 in the transverse direction. In this case, the recessed portion 18 becomes a light blocking portion 18. In other words, without changing the width of the light emission surface portion 6 in the transverse direction, the first light emission surface 6a is formed by shielding the portion of the light emission surface portion 6 that is disposed near the first end face 3 in the longitudinal direction. The recessed portion 18 can block light of a specific angle as reflected by the paraboloidal surface 7. However, the light passing through an unexpected path other than the light of a specific angle as reflected by the paraboloidal surface 7 may not be totally reflected by the recessed portion 18 and may leak out. The light blocking portion 18 and a below-described first light blocking portion 19 can also block light passing through an unexpected path other than the path of the light of the specific angle as reflected by the paraboloidal surface 7. Of course, the recessed portion 18 and the light blocking portion 18 may be used together.

Therefore, the light guides (lighting devices, image reading apparatuses) according to Embodiment 1 to Embodiment 3 include at least one of the recessed portion 18 or the light blocking portion 18. The width of the first light emission surface 6a in the transverse direction is set by an area of the light emission surface portion 6 being limited by at least one of the recessed portion 18 or the light blocking portion 18. The light blocking portion 18 is preferably mirror finished or whitened in order to return the light to the light guide main body 2. However, the light blocking portion 18 may be blackened with the emphasis on a light blocking function. Also, the light blocking portion 18 may be integral with or separate from the light guide main body 2.

Furthermore, the light guides (lighting device, image reading apparatus) according to Embodiments 1 to 3 do not change the cross-sectional shapes of the light guide main body in the transverse direction, and when a portion of the light emission surface portion 6 is shielded, the light guide may be a light blocking portion that is a separate body and separated from the light guide main body 2. The term "separated from" includes a case in which at least a part of the light blocking portion and the light emission surface portion 6 are in contact with each other. In this case, the light blocking portion is configured similarly to the light blocking portion 18. Such a light blocking portion is described as the first light blocking portion 19 in Embodiment 4 and Embodiment 5. Of course, the recessed portion 18 and the first light blocking portion 19 may be used in combination. The width of the first light emission surface 6a in the transverse direction is set by an area of the light emission surface portion 6 being effectively limited by the first light blocking portion 19. That is, in the present application, the width of the first light emission surface 6a obviously does not only mean the physical width but also the width of a part through which the light is substantially emitted, the part being included in the region of the light emission surface portion 6.

A light guide according to Embodiment 4 includes a configuration that blocks unnecessary light entering the reading area of the object 1 to be read by disposing the first light blocking portion 19 on the imaging lens body 8 side (the opposite side of the paraboloidal surface 7) of the light guide main body 2 when the object 1 to be read is installed at a position near the light guide main body 2. That is, such configuration can be said to replace the recessed portion 18 (light blocking portion 18) of the light guide according to Embodiment 1 with the first light blocking portion 19. On the other hand, a light guide according to Embodiment 5 includes a configuration that blocks unnecessary light entering the reading area of the object 1 to be read by disposing the first light blocking portion 19 on the opposite side of the imaging lens body 8 (the paraboloidal surface 7 side) of the light guide main body 2 when the object 1 to be read is installed at a position relatively far from the light guide main body 2. That is, such configuration can be said to replace the recessed portion 18 (light blocking portion 18) of the light guide according to Embodiment 2 with the first light blocking portion 19.

Of course, in order to make the width of the first light emission surface 6a in the transverse direction shorter than the width of the second light emission surface 6b in the transverse direction, in the transverse direction, the first light blocking portion 19 may be formed on the side of the imaging lens body 8 (opposite side of the paraboloidal surface 7 side) of the light guide main body 2 and on the opposite side of the imaging lens body 8 (the paraboloidal surface 7 side). In other words, both the first light blocking portion 19 of the light guide according to Embodiment 4 and the first light blocking portion 19 of the light guide according to Embodiment 2 are formed.

Embodiment 4

Figure 15:
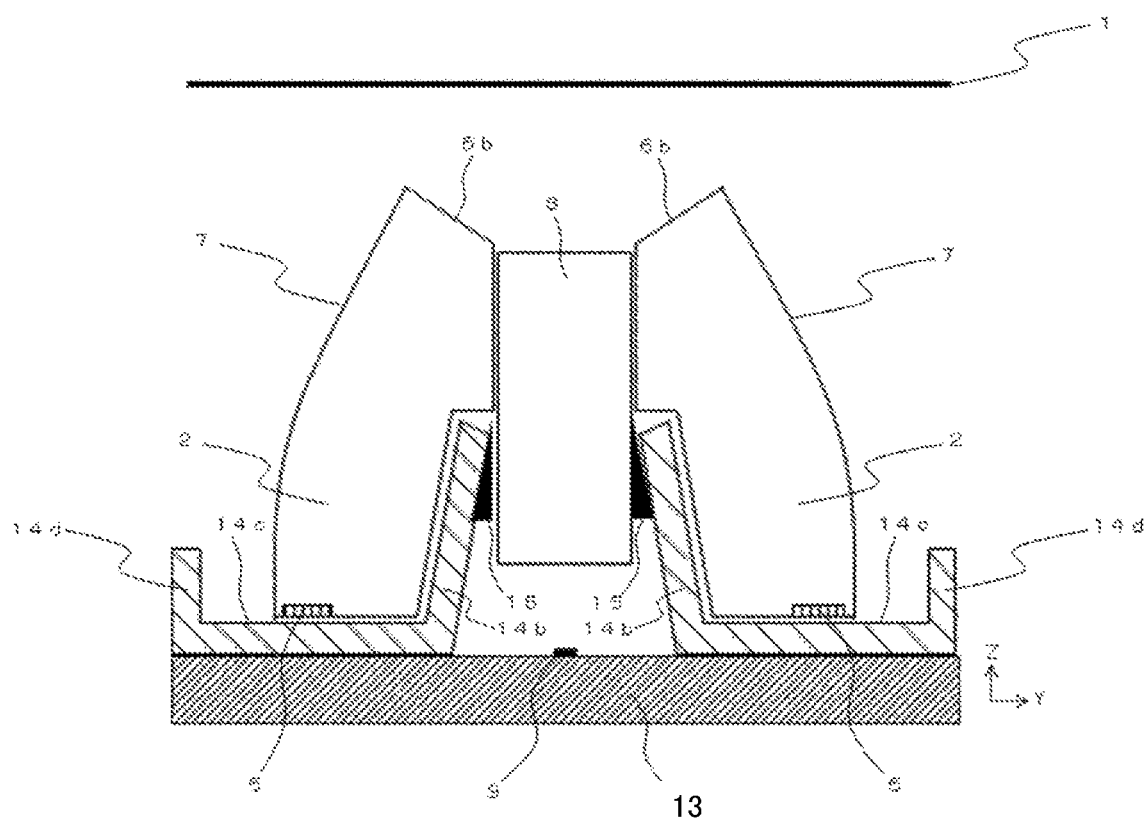
FIG. 15 is a cross-sectional view of the image reading apparatus according to Embodiment 4 of the present disclosure.
Figure 16:
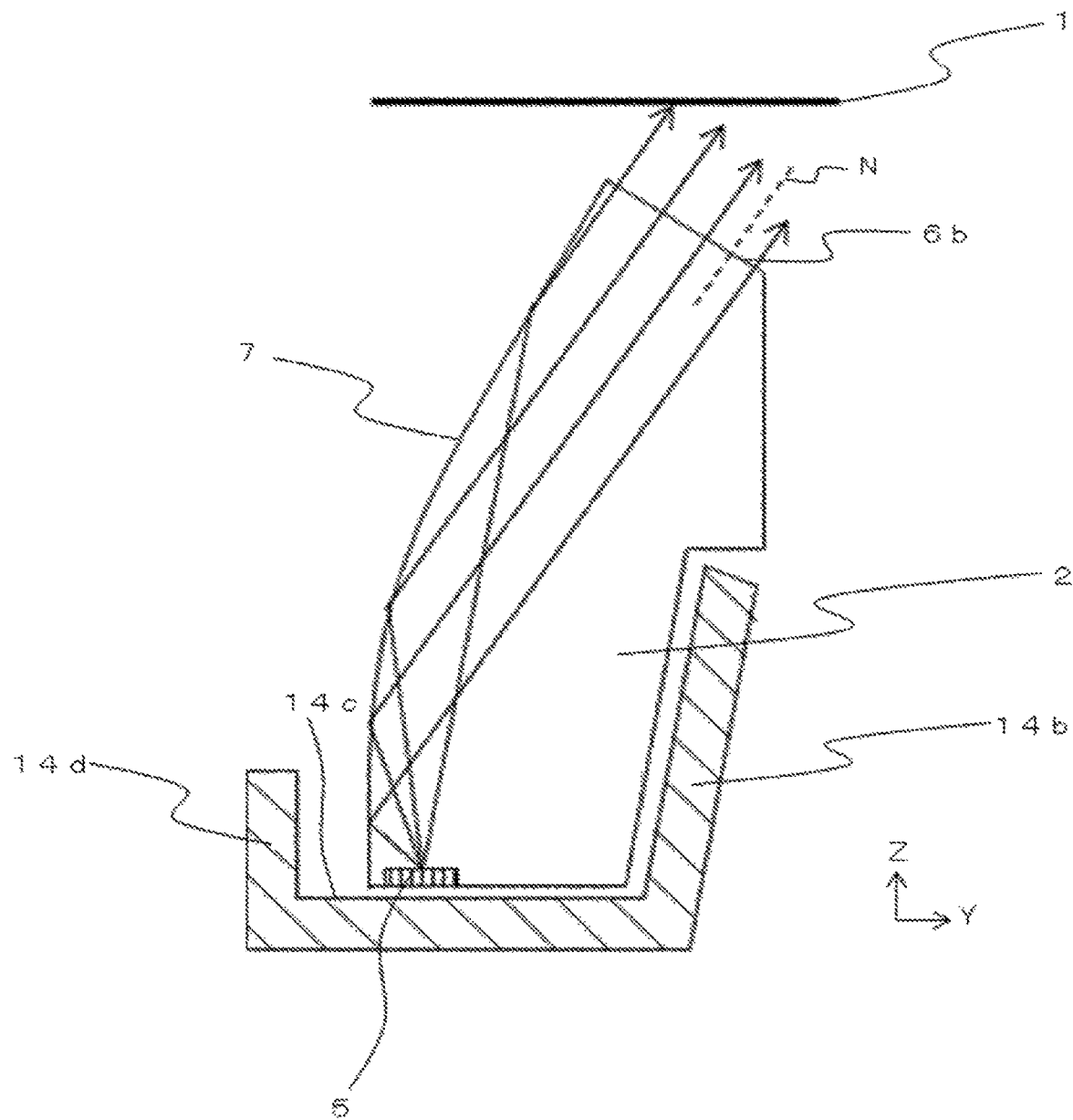
FIG. 16 is a schematic diagram regarding guiding light of the image reading apparatus according to Embodiment 4 of the present disclosure (light guide according to Embodiment 4)
Figure 17:
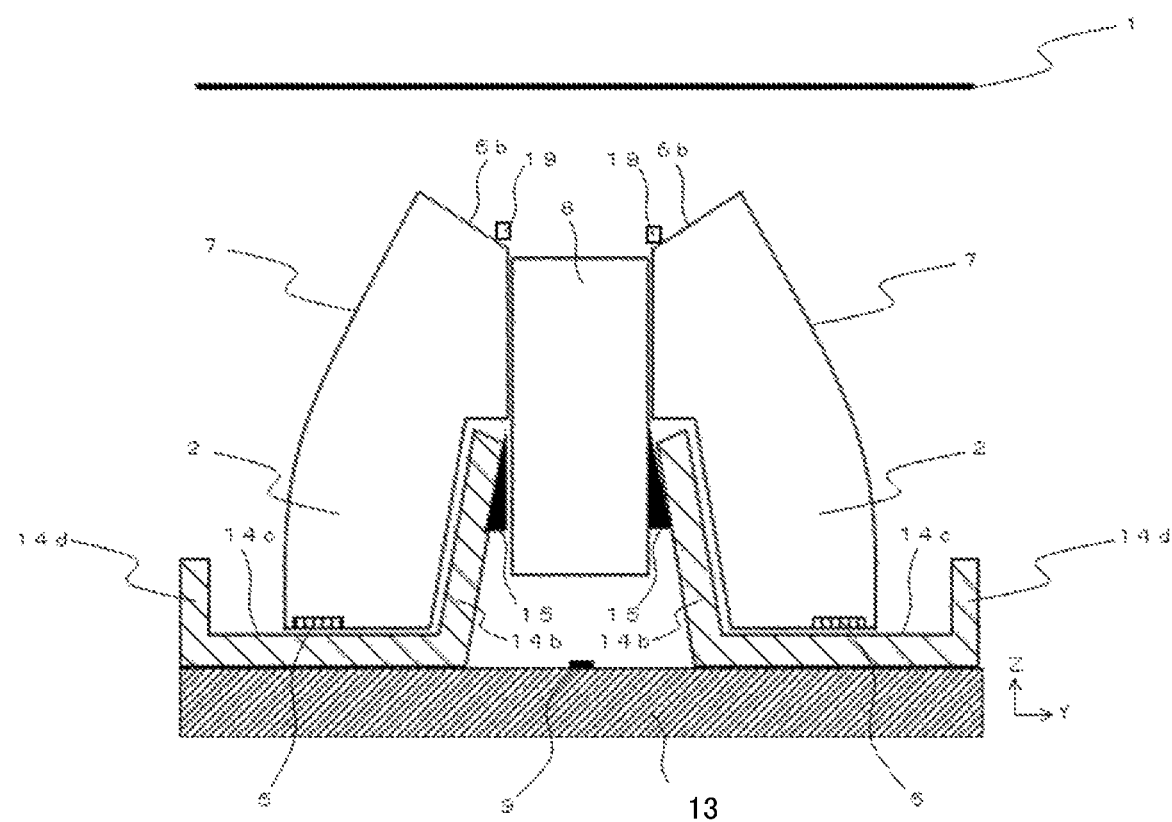
FIG. 17 is a cross-sectional view of the image reading apparatus according to Embodiment 4 of the present disclosure.
Figure 18:
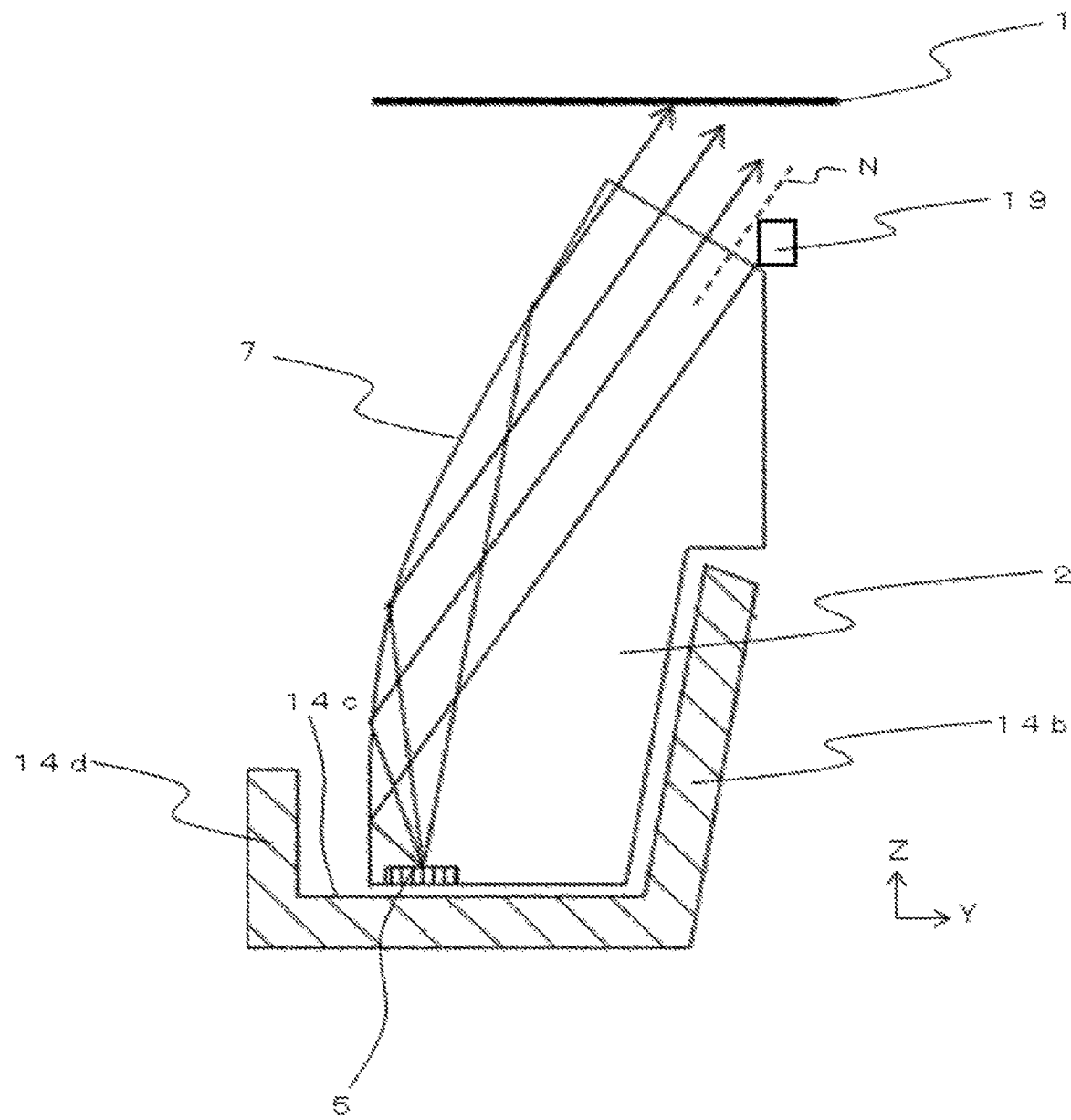
FIG. 18 is a schematic diagram regarding guiding light of the image reading apparatus according to Embodiment 4 of the present disclosure (light guide according to Embodiment 4)

Hereinafter, an image reading apparatus according to Embodiment 4 of the present disclosure is described with reference to FIGS. 13 to 18. The descriptions of the reference signs and the like are omitted for configurations similar to those of the Embodiments 1 through 3. In Embodiment 4, a first light emission surface 6a is formed by an area of the light emission surface portion 6 being effectively limited by the first light blocking portion 19. FIG. 15 is a cross-sectional view of the image reading apparatus in an area surrounded by a dot-and-dash line AA' illustrated in FIG. 14. FIG. 16 is a schematic explanatory view relating to the light guiding of the light guide illustrated in FIG. 15. FIG. 17 is a cross-sectional view of the image reading apparatus in an area surrounded by a dot-and-dash line BB' illustrated in FIG. 14. FIG. 18 is a schematic explanatory view regarding guiding light of the light guide illustrated in FIG. 17. The dot-and-dash line AA' shows a cross section in the vicinity of the center of the light guide main body 2 including the second light emission surface 6b of the light guide main body 2. The dot-and-dash line BB' shows a cross section in the vicinity of a first end face 3 including the first light emission surface 6a of the light guide main body 2. The cross section illustrated in the dot-and-dash line AA' and the cross section illustrated in the dot-and-dash line BB' are in the YZ plane (a plane in which the Y axis direction (Y axis) is orthogonal to the Z axis direction (Z axis)).

Next, with reference to FIGS. 17 and 18, the light emitted from the light emission surface portion 6 including the first light emission surface 6a is described. FIG. 18 is a view schematically representing a main part of the periphery of one of the light guide main bodies 2 of FIG. 17. In FIG. 18, a plurality of arrows indicates light rays, and indicates directions of light rays, respectively. FIG. 18 is also a cross sectional view of the light guide main body 2 at a side end portion of a light source 11 in the YZ plane. Similar to Embodiment 1, when the light enters the first end face 3 from the light source 11 and directly enters a light scattering pattern 5, and then when the light (hereinafter, direct reflection light) reflected by the light scattering pattern 5 reaches in the vicinity of an end portion of the light guide main body 2 in the longitudinal direction, an area with high illuminance tends to be specifically generated, and optical characteristics tend to deteriorate.

Such a tendency for the optical characteristics in the vicinity of the end portion of the light guide main body 2 in the longitudinal direction to deteriorate is easily suppressed in the light guide (lighting device, image reading apparatus) according to Embodiment 4. Specifically, the direct reflection light can be blocked from emitting from the light emission surface portion 6 (the first light emission surface 6a) by forming the first light blocking portion 19 on the light emission surface portion 6 on the side of the first end face 3 to be the width of the first light emission surface 6a that is a width from which the light is substantially emitted. That is, in the light guide according to Embodiment 4, the physical width of the first light emission surface 6a and the physical width of a second light emission surface 6b may be the same in the transverse direction (that is, the width of the light emission surface portion 6 may be the same in any YZ plane) and the physical width of the first light emission surface 6a may be greater than the physical width of the second light emission surface 6b. The first light blocking portion 19 may be in contact with the light emission surface portion 6. In this case, the first light blocking portion 19 is configured similarly to the light blocking portion 18. The first light blocking portion 19 may be configured to hold the light guide main body 2 by the first light blocking portion 19 being in contact with the light emission surface portion 6.

As illustrated in FIGS. 13 to 18, the first light blocking portion 19 may be integral with a light guide holder 10 as described later. In this case, since the first light blocking portion 19 protrudes from the light guide holder 10 in the main scanning direction, the first light blocking portion 19 may be referred to as a protruding portion 19. The first light blocking portion 19 illustrated in FIGS. 13 to 18 illustrates the first light blocking portion 19, a portion of which is in contact with the light emission surface portion 6 of the light guide main body 2. However, the first light blocking portion 19 may be entirely in contact with the light emission surface portion 6 other than the first light emission surface 6a (a third light emission surface 6c) and the second light emission surface 6b. In addition, the first light blocking portion 19 may be formed in the frame 14 (frame inclined portion 14b). In addition, the first light blocking portion 19 may be formed on a side surface of an imaging lens body 8, or may be in contact with the side surface of the imaging lens body 8 to support the imaging lens body 8. Furthermore, in the light guide according to Embodiment 4, the light emission surface portion 6 may include the light non-emission surface 6a contiguous with the first end face 3 between the first end face 3 and the first light emission surface 6a.

The light guide according to Embodiment 4 includes a second light blocking portion 10b. In the light non-emission surface 6a, an emission of light from the light non-emission surface 6a is effectively limited by the second light blocking portion 10b. The limitation of the light non-emission surface 6a also includes a case in which light emitted once is reflected by the light guide holder 10 (the second light blocking portion 10b) and returns to the light guide main body 2. That is, the limitation of the light non-emission surface 6a includes a case in which light emits from the surface of the light non-emission surface 6a itself and a case in which the light from the surface of the light non-emission surface 6a is blocked. Further, the light guide according to Embodiment 4 includes the light guide holder 10 that holds the light guide main body 2. At least one of the first light blocking portion 19 or the second light blocking portion 10b is formed in the light guide holder 10. Therefore, at least one of the first light blocking portion 19 or the second light blocking portion 10b is contiguous with an opening portion 12c. Therefore, the second light blocking portion 10b can also be referred to as a hole portion 10b.

In the light guides (lighting devices, image reading apparatuses) according to Embodiment 1 to Embodiment 3, the first light emission surface 6a is formed by the shape of the light emission surface portion 6, or the light emission surface 6a is formed using a film that shields a portion of the light emission surface portion 6. On the other hand, by using the first light blocking portion 19, the light guide according to Embodiment 4 is superior to the light guides according to Embodiment 1 to Embodiment 3 in that the width of the first light emission surface 6a in the transverse direction can be finely adjusted by replacing the first light blocking portion 19. The first light blocking portion 19 is preferably mirror finished or whitened in order to return the light to the light guide main body 2, but may be blackened with the emphasis on a light blocking function. When the first light blocking portion 19 is formed integrally with the light guide holder 10, the color of the first light blocking portion 19 may be a similar color as that of the light guide holder 10 (preferably, a color having high reflectance such as white), or different colors may be used as long as molding in the different colors is possible.

Fifth Embodiment

Figure 19:
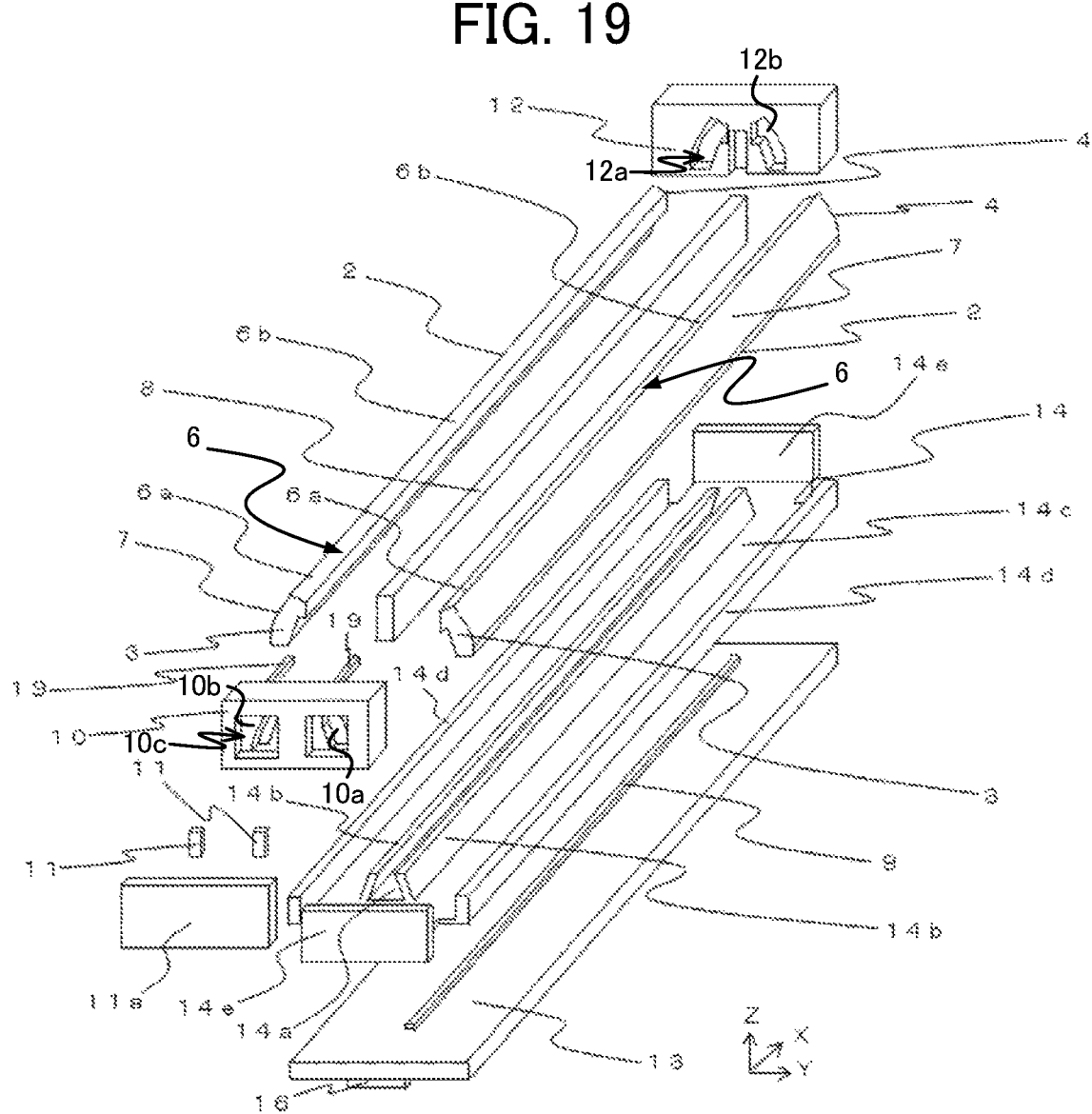
FIG. 19 is an exploded perspective view of an image reading apparatus according to Embodiment 5 of the present disclosure (a perspective view of a light guide according to Embodiment 5)
Figure 20:
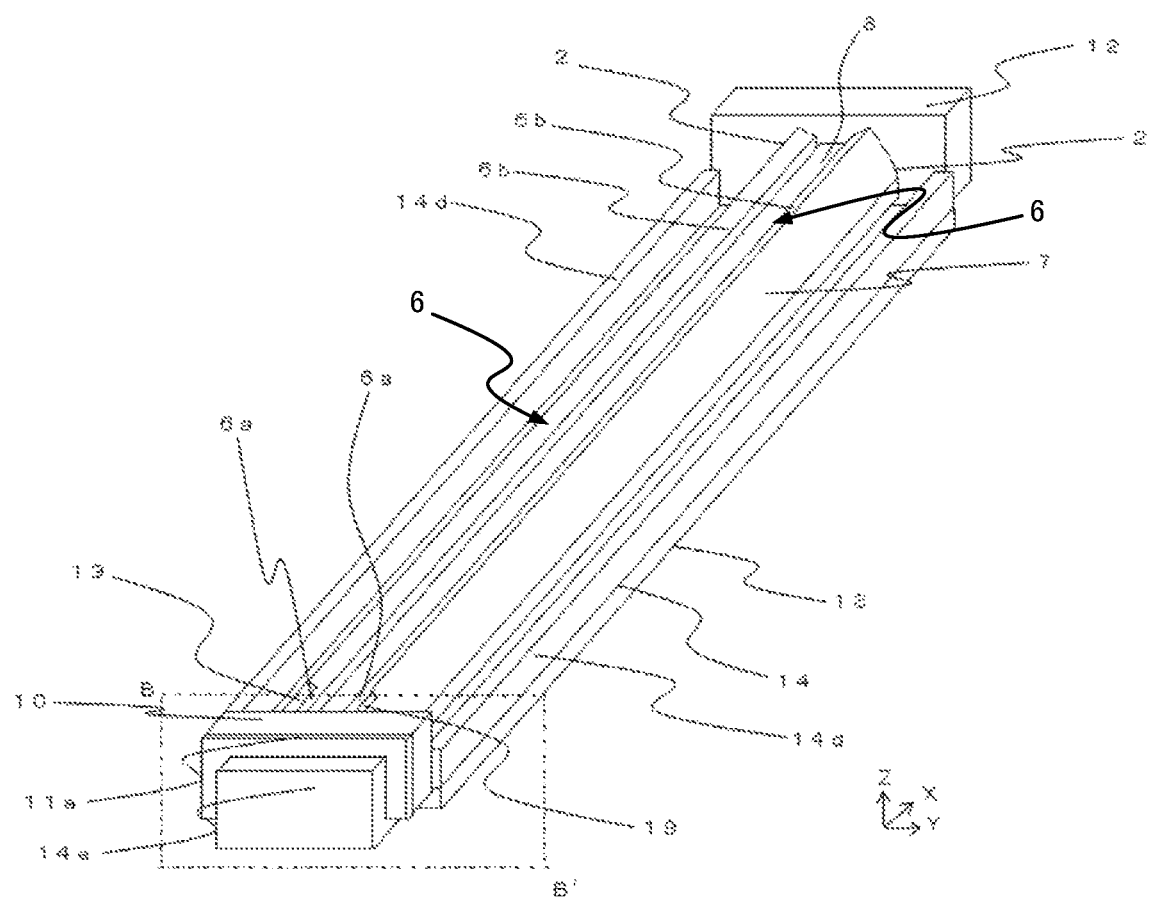
FIG. 20 is a perspective view of the image reading apparatus according to Embodiment 5 of the present disclosure.
Figure 21:
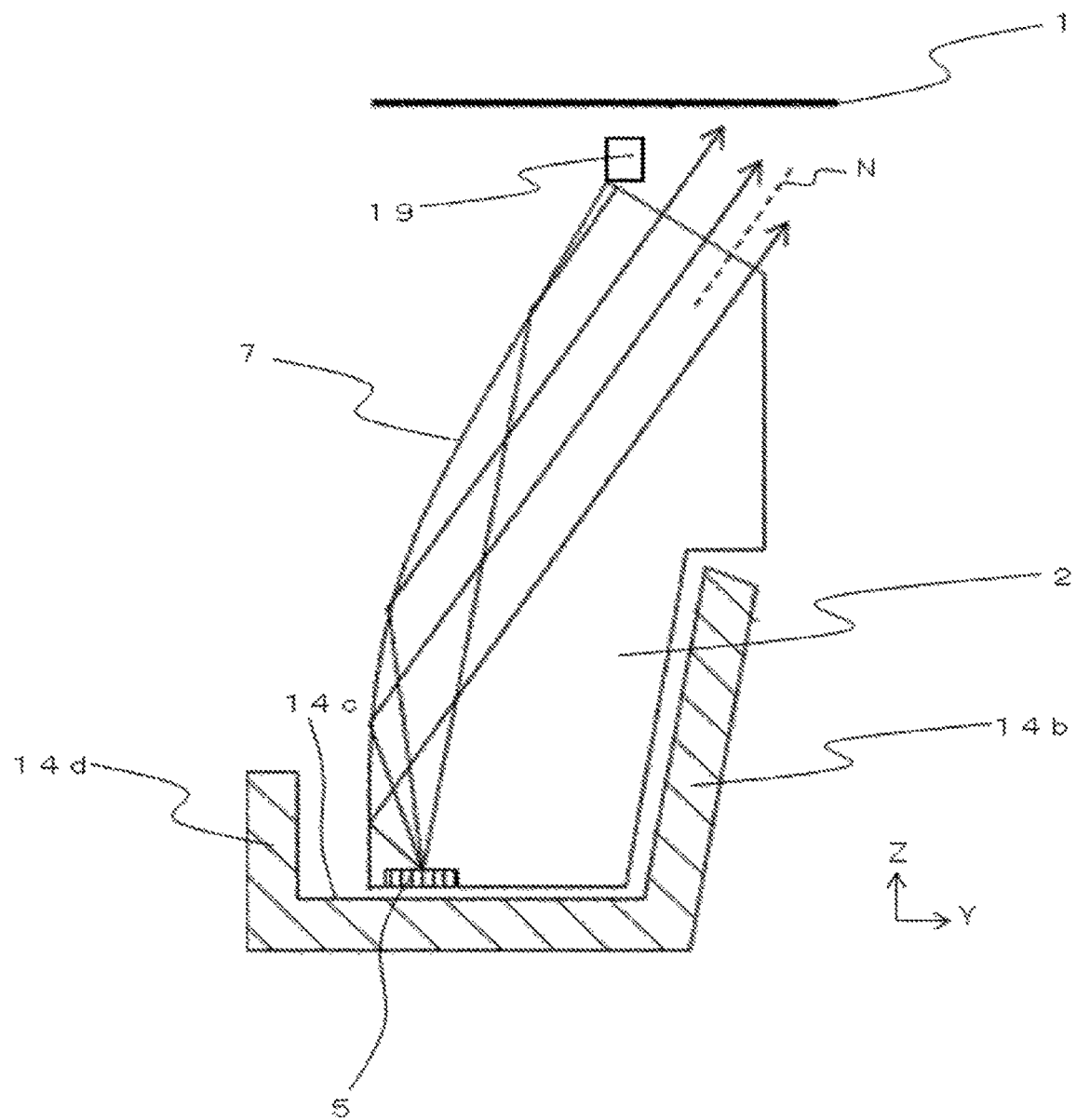
FIG. 21 is a cross-sectional view of the image reading apparatus according to Embodiment 5 of the present disclosure.

Hereinafter, an image reading apparatus according to Embodiment 5 of the present disclosure is described with reference to FIGS. 19 to 21. The descriptions of the reference signs and the like are omitted for configurations similar to those of the Embodiments 1 through 4. In Embodiment 5, a first light emission surface 6a is formed by an area of the light emission surface portion 6 being effectively limited by the first light blocking portion 19. FIGS. 19 to 21 correspond to FIGS. 13, 14, and 19. Specifically, FIG. 19 is an exploded perspective view of an image reading apparatus (perspective view of a light guide). FIG. 20 is a perspective view of the image reading apparatus. FIG. 21 is a schematic explanatory view regarding guiding light of the image reading apparatus (light guide body). FIG. 21 is a cross-sectional view of the image reading apparatus in an area surrounded by a dot-and-dash line BB' illustrated in FIG. 20.

The light guide according to Embodiment 4 is configured to block unnecessary light entering the reading area of the object 1 to be read by disposing the first light blocking portion 19 on the side of the imaging lens body 8 of the light guide main body 2 when the object 1 to be read is arranged at a position near the light guide main body 2. On the other hand, the light guide according to Embodiment 5 includes a configuration that blocks unnecessary light entering the reading area of the object 1 to be read when the object 1 to be read is arranged at a position relatively far away from the light guide main body 2.

As illustrated in FIGS. 19 to 21, in the light guide according to Embodiment 5, the first light blocking portion 19 is provided on the side opposite to the imaging lens body 8 of the light guide main body 2. That is, the first light blocking portion 19 is formed on the side of the paraboloidal surface 7. In the case in which the installation position of the object 1 to be read is far, and in the case in which the optical characteristics near the end portion of the light guide main body 2 in the longitudinal direction are deteriorated, direct reflection light can be blocked. Thus, uniform optical characteristics can be obtained over the entire region in the main scanning direction. By using the first light blocking portion 19, the light guide according to Embodiment 5 is superior to the light guides according to Embodiment 1 to Embodiment 3 in that the width of the first light emission surface 6a in the transverse direction can be finely adjusted by replacing the first light blocking portion 19.

Although in the light guide according to Embodiment 4, the first light blocking portion 19 is formed on the imaging lens body 8 side (the opposite side of the paraboloidal surface 7 side) of the light guide main body 2 in the transverse direction. In contrast, in the light guide according to Embodiment 5, the first light blocking portion 19 is formed on the opposite side of the imaging lens body 8 (the paraboloidal surface 7 side) of the light guide main body 2 in the transverse direction. Of course, in order to make the width of the first light emission surface 6a in the transverse direction shorter than the width of the second light emission surface 6b in the transverse direction, the first light blocking portion 19 may be formed both on the imaging lens body 8 side (opposite side of the paraboloidal surface 7 side) and on the opposite side of the imaging lens body 8 (the paraboloidal surface 7 side) of the light guide main body 2 in the transverse direction. In other words, both the first light blocking portion 19 of the light guide according to Embodiment 4 and the first light blocking portion 19 of the light guide according to Embodiment 5 are formed.

In addition, the first light blocking portions 19 of the light guides according to Embodiment 4 and Embodiment 5 may effectively limit emission of light from the first light emission surface 6a based on the same concept as that of the recessed portion 18 of the light guide according to Embodiment 3. In other words, the first light blocking portion 19, facing a portion where the first light emission surface 6a and the second light emission surface 6b are contiguous each other and the light is effectively emitted, may be tapered, or alternatively, the entire first light blocking portion 19 may be tapered. Also, the first light blocking portion 19 may be stepped for a portion other than the contiguous portion. Or conversely, the contiguous portion may be stepped.

So far, in Embodiments 1 through 5, only a case in which light from the light source 11 enters from the first end face 3 is illustrated. However, the light from the light source 11 may also enter from the second end face 4. In that case, the light guide main body 2 may further include the second end face 4 along the transverse direction crossing the longitudinal direction, the second end face 4 being an end face of the light guide main body 2 facing the first end face 3, and the light emission surface portion 6 may be set to further include the third light emission surface 6c that is disposed near the second end face 4 in the longitudinal direction.

The third light emission surface 6c is contiguous with the second light emission surface 6b in the longitudinal direction and a light scattering pattern 5 scatters light that enters from the second end face 4 and is guided inside the light guide. The width of the third light emission surface 6c in the transverse direction is shorter than the width of the second light emission surface 6b in the transverse direction. The third light emission surface 6c preferably has the same shape as that of the first light emission surface 6a. Similar to the case of the first light emission surface 6a, the recessed portion 18 (light blocking portion 18) and/or the first light blocking portion 19 are formed around the third light emission surface 6c.

Therefore, the light guides (lighting devices, image reading apparatuses) according to Embodiment 1 to Embodiment 5 may include the third light emission surface 6c (the recessed portion 18 (the light blocking portion 18) that forms the third light emission surface 6c). Or the area of the light emission surface portion 6 may be effectively limited by the first light blocking portion 19 to form the third light emission surface 6c. In such a case, the light guide holder 12 has the same configuration as the light guide holder 10.

In the image reading apparatuses (lighting apparatuses) according to Embodiment 1 to Embodiment 5, cases are described in which there are two light guides (the light guide main body 2). However, the number of the light guides may be one. Further, in the light guides (lighting devices) according to Embodiment 1 to Embodiment 5, examples are cited of the use of the light guides as a reflection light source. However, as described above, the light guides according to Embodiment 1 to Embodiment 5 (Lighting device) may be used as a transmission light source.

REFERENCE SIGNS LIST

1 Object to be irradiated (object to be read)
2 Light guide main body (transparent body)
3 First end face
4 Second end face
5 Light scattering pattern
6 Light emission surface portion
6a First light emission surface (rotation suppressing portion, light non-emission surface)
6b Second light emission surface (rotation suppressing portion)
6c Third light emission surface
7 Paraboloidal surface
8 Rod lens array (microlens array, lens array, imaging lens body)
9 Light receiving element array (light receiving element, sensor IC)
10 Light guide holder
10a Opening portion
10b Through hole portion (second light blocking portion, hole portion)
11 Light source
11a Light source substrate
12 Light guide holder
12a Opening portion
12b Hole portion (through hole portion)
12c Opening portion
13 Sensor substrate (signal processing substrate)
14 Frame
14a Frame opening portion
14b Frame inclined portion
14c Frame flat surface portion
14d Frame side wall portion
14e Holder attachment portion
15 Adhesive member (holding member, tape)
16 External connector
17 Signal processing IC (ASIC)
17a CPU
17b RAM
17c Signal processing circuit
17d Light source drive circuit
18 Recessed portion (cutout portion, light blocking portion)
19 First light blocking portion (protruding portion).

The invention claimed is:

1. A light guide, comprising:
a rod-shaped light guide main body extending in a longitudinal direction;
a first end face that is an end face of the light guide main body along a transverse direction intersecting the longitudinal direction;
a light scattering pattern formed in the light guide main body along the longitudinal direction, the light scattering pattern scattering light that enters the light scattering pattern from the first end face and is guided inside the light guide main body; and
a light emission surface portion formed on the light guide main body along the longitudinal direction, the light emission surface portion being a surface from which the light scattered at the light scattering pattern is emitted to outside the light guide main body after being reflected on a wall surface of the light guide main body,
wherein the light emission surface portion comprises:
a first light emission surface that is disposed near the first end face in the longitudinal direction; and
a second light emission surface contiguous with the first light emission surface in the longitudinal direction, and
a width of the first light emission surface in the transverse direction is shorter than a width of the second light emission surface in the transverse direction.

2. The light guide according to claim 1, further comprising a paraboloidal surface having a parabolic cross section that is taken along the transverse direction, the paraboloidal surface being the wall surface contiguous with the light emission surface portion,
wherein the light scattering pattern is formed at a focal point of the paraboloidal surface on a cross section along the transverse direction.

3. The light guide according to claim 2, wherein the light emission surface portion on the cross section along the transverse direction is a straight line, and a normal direction of the straight line and an optical axis direction of the light reflected on the paraboloidal surface are parallel.

4. The light guide according to claim 1, wherein an outer shape of the first light emission surface and an outer shape of the second light emission surface are contiguous with each other, and at least one of the first light emission surface or the second light emission surface is stepped.

5. The light guide according to claim 1, wherein an outer shape of the first light emission surface and an outer shape of the second light emission surface are contiguous with each other, and at least one of the first light emission surface or the second light emission surface is tapered.

6. The light guide according to claim 1, wherein the width of the first light emission surface in the transverse direction decreases in a stepwise or tapered manner as a distance from the first end face decreases.

7. The light guide according to claim 1, wherein the light guide main body includes at least one of a recessed portion or a light blocking portion, and the width of the first light emission surface in the transverse direction is set by an area of the light emission surface portion being limited by at least one of the recessed portion or the light blocking portion.

8. The light guide according to claim 1, further comprising a first light blocking portion, wherein the width of the first light emission surface in the transverse direction is set by an area of the light emission surface portion being effectively limited by the first light blocking portion.

9. The light guide according to claim 8, wherein
the light emission surface portion comprises a light non-emission surface that is contiguous with the first end face, between the first end face and the first light emission surface,
the image reading apparatus further comprises a second light blocking portion, and
in the light non-emission surface, light emission from the light non-emission surface is effectively limited by the second light blocking portion.

10. The light guide according to claim 9, further comprising a light guide holder to hold the light guide main body, at least one of the first light blocking portion or the second light blocking portion being formed in the light guide holder.

11. The light guide according to claim 10,
wherein the light guide holder comprises:
an opening portion into which is inserted the first end face with at least a portion of the first light emission surface being exposed; and
a through-hole portion to allow light to pass between a side of the opening portion into which the first end face portion is inserted and the opposite side thereof.

12. The light guide according to claim 11, wherein at least one of the first light blocking portion or the second light blocking portion is contiguous with the opening portion.

13. An image reading apparatus comprising:
the light guide according to claim 10,
an imaging lens body to converge the light emitted from the light emission surface portion and reflected by the object to be read, or converge the light emitted from the light emission surface portion and transmitted through the object to be read; and
a light receiving element to receive the light converged by the imaging lens body.

14. The light guide according to claim 1, further comprising
a second end face facing the first end face, the second end face portion being an end face of the light guide main body along the transverse direction intersecting the longitudinal direction,
wherein the light emission surface portion further comprises a third light emission surface that is disposed near the second end face in the longitudinal direction,
the third light emission surface is contiguous with the second light emission surface in the longitudinal direction,
the light scattering pattern scatters light that enters the light scattering pattern from the second light emission surface and is guided inside the light guide main body, and
a width of the third light emission surface in the transverse direction is shorter than the width of the second light emission surface in the transverse direction.

15. The light guide according to claim 14, wherein the third light emission surface has the same shape as the first light emission surface.

16. The light guide according to claim 1, wherein the light emission surface portion comprises a light non-emission surface that is contiguous with the first end face, between the first end face and the first light emission surface.

17. An image reading apparatus comprising:
the light guide according to claim 1,
an imaging lens body to converge the light emitted from the light emission surface portion and reflected by the object to be read, or converge the light emitted from the light emission surface portion and transmitted through the object to be read; and
a light receiving element to receive the light converged by the imaging lens body.

18. The image reading apparatus according to claim 17, further comprising a light guide holder to hold the light guide main body, the light guide holder comprising:
an opening portion into which is inserted the first end face portion with at least a portion of the first light emission surface being exposed; and
a through-hole portion to allow light to pass between a side of the opening portion into which the first end face portion is inserted and the opposite side thereof.

19. An image reading apparatus comprising two light guides, a first light guide and a second light guide,
wherein each of the two light guides comprises:
a rod-shaped light guide main body extending in a longitudinal direction;
a first end face that is an end face of the light guide main body along a transverse direction intersecting the longitudinal direction;
a light scattering pattern formed in the light guide main body along the longitudinal direction, the light scattering pattern scattering light that enters the light scattering pattern from the first end face and is guided inside the light guide main body;
a light emission surface portion formed on the light guide main body along the longitudinal direction, the light emission surface portion being a surface from which the light scattered at the light scattering pattern is emitted to outside the light guide main body after being reflected on a wall surface of the light guide main body; and
a paraboloidal surface having a parabolic cross section taken along the transverse direction, the paraboloidal surface being the wall surface contiguous with the light emission surface portion,
wherein the light guide main body of the first light guide and the light guide main body of the second light guide are arranged to face each other outwardly directing the paraboloidal surfaces on a cross section along the transverse direction;
wherein the image reading apparatus further comprises:
a lens array extending in the longitudinal direction disposed between the light guide main body of the first light guide and the light guide main body of the second light guide, the lens array converging the light emitted from the light emission surface portion and reflected by an object to be read; and
a light receiving element array, extending in the longitudinal direction, to receive the light converged by the lens array,
wherein each of the light emission surface portions comprises:
a first light emission surface that is disposed near the first end face in the longitudinal direction; and
a second light emission surface contiguous with the first light emission surface in the longitudinal direction,
wherein a width of the first light emission surface in the transverse direction is shorter than a width of the second light emission surface in the transverse direction,
wherein the light scattering pattern is formed at a focal point of the paraboloidal surface on the cross section along the transverse direction,
wherein the light emission surface portion on the cross section along the transverse direction is a straight line, and
wherein a normal direction of the straight line and an optical axis direction of the light reflected on the paraboloidal surface are parallel.

20. The image reading apparatus according to claim 19, further comprising a first light blocking portion, wherein the width of the first light emission surface in the transverse direction is set by an area of the light emission surface portion being effectively limited by the first light blocking portion.

* * * * *